US009189772B2

(12) United States Patent
Levit

(10) Patent No.: US 9,189,772 B2
(45) Date of Patent: Nov. 17, 2015

(54) CONTROL AND VERIFICATION OF PERMISSIONS

(75) Inventor: Grigory Levit, Petach Tikva (IL)

(73) Assignee: Gregory Azbel, Richmond Hill, Ontario (CA)

( * ) Notice: Subject to any disclaimer, the term of this patent is extended or adjusted under 35 U.S.C. 154(b) by 103 days.

(21) Appl. No.: 13/148,318

(22) PCT Filed: Mar. 31, 2010

(86) PCT No.: PCT/IB2010/051402
§ 371 (c)(1),
(2), (4) Date: Aug. 8, 2011

(87) PCT Pub. No.: WO2010/124810
PCT Pub. Date: Nov. 11, 2010

(65) Prior Publication Data
US 2012/0090037 A1    Apr. 12, 2012

Related U.S. Application Data

(63) Continuation-in-part of application No. PCT/IB2009/051868, filed on May 6, 2009.

(51) Int. Cl.
G06Q 10/10        (2012.01)
G06F 21/62        (2013.01)
G06Q 10/06        (2012.01)

(52) U.S. Cl.
CPC ............ *G06Q 10/103* (2013.01); *G06F 21/629* (2013.01); *G06F 21/6218* (2013.01); *G06Q 10/067* (2013.01)

(58) Field of Classification Search
CPC .......... G06F 7/02; G06F 21/62; G06Q 10/06; H04L 63/10
USPC ......................................................... 726/28
See application file for complete search history.

(56) References Cited

U.S. PATENT DOCUMENTS 6,005,571 A      12/1999  Pachauri
6,289,462 B1 *   9/2001   McNabb et al. ................ 726/21

(Continued)

OTHER PUBLICATIONS

International Application PCT/IB2009/051868 Search Report dated Oct. 26, 2009.

(Continued)

*Primary Examiner* — Harunur Rashid
(74) *Attorney, Agent, or Firm* — D. Kligler I.P. Services Ltd.

(57)    ABSTRACT

A verification method includes configuring a reference system, running on a computer, to have the same set of executables and customizations as an e-business system to be verified. The reference system is configured with one or more roles that have permissions to execute all transactions in a scope of a planned verification. One or more business processes that are implemented in the e-business system and are in the scope of the planned verification are mapped and are executed using the reference system. Reference data is created by merging records from logs of the permission checks with respect to at least one role in the scope of the verification. Permission settings for roles in the e-business system are compared with corresponding permission values in the reference data. Based on comparing the permission settings, an indication is displayed to a user of whether the permission settings match the corresponding permission values.

30 Claims, 23 Drawing Sheets

(56) References Cited

U.S. PATENT DOCUMENTS

| | | | |
|---|---|---|---|
| 6,957,186 | B1 | 10/2005 | Guheen et al. |
| 7,343,628 | B2 | 3/2008 | Buchholz et al. |
| 7,441,051 | B2 | 10/2008 | Brown et al. |
| 7,747,736 | B2 | 6/2010 | Childress et al. |
| 7,877,409 | B2 | 1/2011 | Lim |
| 2004/0215650 | A1* | 10/2004 | Shaji et al. .................... 707/102 |
| 2007/0282986 | A1* | 12/2007 | Childress et al. ............. 709/223 |
| 2007/0283443 | A1 | 12/2007 | McPherson et al. |
| 2008/0109898 | A1 | 5/2008 | Mohammed et al. |
| 2008/0120240 | A1 | 5/2008 | Ginter et al. |
| 2009/0319527 | A1* | 12/2009 | King et al. ........................ 707/9 |
| 2010/0162389 | A1* | 6/2010 | Burger et al. ................... 726/21 |

OTHER PUBLICATIONS

International Application PCT/IB2010/051402 Search Report dated Sep. 16, 2010.

Control Software International BV., "CSI Tools Authorization Auditor and Authorization Organizer", Data Sheets, year 2009.

CA Transforming IT Management., "CA Eurekify Role & Compliance Manager", Product Brief, year 2009.

SAP AG., "SAP® BusinessObjects™ Access Control—Confidently Control Access and Prevent Fraud", year 2010.

Sarbanes-Oxley Act of 2002—Sarbanes-Oxley Essential Information, years 2003-2006 (downloaded from http://www.sox-online.com/basics.html).

* cited by examiner

| Merged Snapshot ID | Mapped Roles | Transaction | Check | Parameters |
|---|---|---|---|---|
| Merged Snapshot 1 | Role 1 | Transaction 1 | Check 1 | P1 = V1, P2 = V2, ... Pm = Vm |
|  |  |  | Check 2 |  |
|  | Role 1 | Transaction 2 | ... |  |
| Merged Snapshot 2 | Role 2 | Transaction 2 | Check K |  |
| ... |  |  |  |  |
| Merged Snapshot r | Role l | Transaction n |  |  |

905 — Merged Snapshot ID
910 — Mapped Roles
925 — Transaction
930 — Check
935 — Parameters

Fig. 9

| Snapshot ID | Check | Parameter | Value (from) | Value (to) | Exclusion Flag |
|---|---|---|---|---|---|
| 1005 | 1010 | 1015 | 1020 | 1025 | 1030 |
| | | | | | |

Fig. 10

| Transaction | Check | Parameter | Value from | Value to |
|---|---|---|---|---|
| Transaction 1 | Check 1 | P1 | V1 | |
| | Check 2 | P2 | V2 | V4 |
| | ••• | Pm | Vm | |
| | Check K | | | |
| Transaction 2 | | | | |
| Transaction 3 | | | | |
| ••• | | | | |
| Transaction n | | | | |

Fig. 18

CONTROL AND VERIFICATION OF PERMISSIONS

CROSS-REFERENCE TO RELATED APPLICATION

This application is a continuation-in-part of PCT Patent Application PCT/IB2009/051868, filed May 6, 2009, whose disclosure is incorporated herein by reference.

TECHNICAL FIELD

The present invention relates to a computerized database system. More specifically, it relates to a method and a system for verification of permissions in e-business systems, wherein reference data is generated in a specially configured reference system for subsequent comparison with the verified system.

BACKGROUND ART

E-business involves business processes spanning the entire value chain: electronic purchasing and supply chain management, processing orders electronically, handling customer service, and cooperating with business partners. Special technical standards for e-business facilitate the exchange of data between companies. E-business software solutions allow the integration of intra and inter firm business processes. E-business can be conducted using the Web, the Internet, intranets, extranets, or some combination of these.

Enterprise Resource Planning (ERP) is one of the major areas of e-business applications. ERP is an enterprise-wide information system designed to coordinate all the resources, information, and activities needed to complete business processes such as order fulfillment or billing. A standard functionality of an ERP system is to implement the business processes of the organization. A business process is implemented as a sequence of transactions. The exact implementation depends on the specific ERP product and its architecture.

Standard business processes are usually defined within the relevant module of an e-business product. For example, these could be modules implementing financial operations, warehouse management, human resources, customer relations management and others.

A business process implemented within the e-business system may contain one or more sub-processes. For example, within the business process 'Purchase Order' the possible sub-processes may be 'Create Purchase Order', 'Change Purchase Order' and 'Display Order'. Execution of the sub-processes would mean a different sequence of transactions to be executed. Moreover, the same transaction might have different permission level when executed within the different sub-processes of the same business process. For example, a transaction handling documents would open a document for editing in 'Change Purchase Order' sub-process, but will only permit 'read' when reached through the 'Display order' sub-process.

Most e-business products provide a degree of flexibility in customizing the standard out-of-the-box business process to the specific needs of an organization. This is generally achieved by adding and removing transactions with their corresponding parameters to and from the originally defined sequence of processes and sub-processes.

There is a number of existing products assisting the user with configuring the permissions for the transactions in the system. These products either perform an audit of the already implemented permissions structure or alternatively suggest an optimal permissions structure in the context of business processes in the system. The core element of these products is a database containing restrictions on transactions that a certain user can access in accordance to Risk Management methodology, such as Sarbanes Oxley. Examples of these products are Virsa tools by SAP AG, Authorization Organizer and Authorization Auditor by CSI tools, Eurekify Enterprise Role & Compliance Management Suite by Eurekify Ltd. and others.

U.S. Pat. No. 6,005,571, 'Graphical user interface for managing security in a database system,' describes a method for management of security in an ERP system. The method includes producing a plurality of task groups, which include actions that may be performed by the users. The patent also covers a graphical user interface that can be used to perform these tasks.

U.S. Pat. No. 7,343,628, 'Authorization data model,' suggests a structure of security permissions and possible implementation of security authorization process in an enterprise system.

SUMMARY

An embodiment of the present invention provides a verification method, which includes configuring a reference system, running on a computer, to have the same set of executables and customizations as an e-business system to be verified. The reference system is configured with one or more roles that have permissions to execute all transactions in a scope of a planned verification. One or more business processes that are implemented in the e-business system and are in the scope of the planned verification are mapped and are executed using the reference system. Logs of permission checks conducted in the business processes are saved in a repository. Reference data is created by merging records from the logs of the permission checks with respect to at least one role in the scope of the verification. Permission settings for the at least one role in the e-business system are compared with corresponding permission values in the reference data for the at least one role. Based on comparing the permission settings, an indication is displayed to a user of whether the permission settings match the corresponding permission values.

In a disclosed embodiment, the mapping of the business processes is accomplished by importing the business processes from an external software system. The reference data may be generated in a dedicated e-business system environment not connected to the verified system.

Typically, merging the records from the logs includes processing the logs both manually and automatically, wherein entries in a specified list are automatically deleted from the logs. Comparing the permission settings may be done automatically using a comparison algorithm. In some embodiments, merging the records includes automatically eliminating information repeated in the merged logs. The verified system may be queried automatically to obtain a list of the roles with the permissions settings. Typically, the reference system is configured to provide a maximal level of detail in the logs.

In one embodiment, configuring the reference system with the one or more roles includes configuring the reference system to provide a maximal level of detail in the logs.

In a disclosed embodiment, comparing the permission settings includes the steps of:

(a) recursively executing, starting from a top level in a hierarchical structure of a reference view, a comparison between permission values at each level in the hierarchical structure, with corresponding values in a graphical user interface of the verified system;

(b) marking Boolean "true" in a results table for each of the values in the hierarchical structure for which the compared values are equal; and (c) repeating step (a) for the next level of data under each of the values of the hierarchical structure for which Boolean "true" was produced in a previous iteration.

Creating the reference data may include automatically deleting from the logs information that does not pertain to the permissions, wherein the information to be deleted is stored in a dedicated list.

There is also provided, in accordance with an embodiment of the present invention, a verification apparatus, including a memory, an interface and a processor, which is coupled to communicate via the interface with a reference system configured to have the same set of executables and customizations as an e-business system to be verified and configured with one or more roles that have permissions to execute all transactions in a scope of a planned verification. The processor is operative to map one or more business processes that are implemented in the e-business system and are in the scope of the planned verification, and upon executing the one or more business processes using the reference system, to save in the memory logs of permission checks conducted in the business processes, to create reference data by merging records from the logs of the permission checks with respect to at least one role in the scope of the verification, to compare permission settings for the at least one role in the e-business system with corresponding permission values in the reference data for the at least one role, and based on comparing the permission settings, to display to a user an indication of whether the permission settings match the corresponding permission values.

There is additionally provided, in accordance with an embodiment of the present invention, a computer software product, including a computer-readable medium in which program instructions are stored, which instructions, when read by a computer, cause the computer to communicate via an interface with a reference system configured to have the same set of executables and customizations as an e-business system to be verified and configured with one or more roles that have permissions to execute all transactions in a scope of a planned verification, and to map one or more business processes that are implemented in the e-business system and are in the scope of the planned verification, and upon executing the one or more business processes using the reference system, to save in a repository logs of permission checks conducted in the business processes, to create reference data by merging records from the logs of the permission checks with respect to at least one role in the scope of the verification, to compare permission settings for the at least one role in the e-business system with corresponding permission values in the reference data for the at least one role, and based on comparing the permission settings, to display to a user an indication of whether the permission settings match the corresponding permission values.

There is further provided, in accordance with an embodiment of the invention, a method for business process control, including configuring a reference system, running on a computer, to have the same set of executables and customizations as an e-business system in which a business process is to be executed. The reference system is configured with one or more roles that have permissions to execute all transactions in a scope of the business process. The one or more business processes are executed using the reference system, and logs of permission checks conducted in the business process are saved in a repository. Reference data is created by merging records from the logs of the permission checks with respect to at least one transaction in the scope of the business process. Based on the reference data, the permissions are set for at least one role to perform the at least one transaction during the execution of the business process in the e-business system.

In a disclosed embodiment, creating the reference data includes recording one or more parameters and values of the one or more parameters that are used in the permission checks, and setting the permissions includes applying the values of the one or more parameters to the permissions set for the at least one role. Applying the values may include editing the values that are applied in the permissions.

There is moreover provided, in accordance with an embodiment of the invention, apparatus for permission control, including a memory, an interface, and a processor, which is coupled to communicate via the interface with a reference system configured to have the same set of executables and customizations as an e-business system in which a business process is to be executed and configured with one or more roles that have permissions to execute all transactions in a scope of the business process. The processor is operative to execute the one or more business processes, using the reference system, and to save in a repository logs of permission checks conducted in the business process, and to create reference data by merging records from the logs of the permission checks with respect to at least one transaction in the scope of the business process, and based on the reference data, to set the permissions for at least one role to perform the at least one transaction during the execution of the business process in the e-business system.

There is furthermore provided, in accordance with an embodiment of the invention, a computer software product, including a computer-readable medium in which program instructions are stored, which instructions, when read by a computer, cause the computer to communicate via an interface with a reference system configured to have the same set of executables and customizations as an e-business system in which a business process is to be executed and configured with one or more roles that have permissions to execute all transactions in a scope of the business process, and to execute the one or more business processes, using the reference system, and to save in a repository logs of permission checks conducted in the business process, and to create reference data by merging records from the logs of the permission checks with respect to at least one transaction in the scope of the business process, and based on the reference data, to set the permissions for at least one role to perform the at least one transaction during the execution of the business process in the e-business system.

Other features of one or more embodiments of the invention are set forth in the accompanying drawing and the description below. Features, objects, and advantages of the invention will be apparent from the description and drawings, and from the claims.

BRIEF DESCRIPTION OF DRAWINGS

FIG. 9 shows details of the structure of the Reference Database.

FIG. 10 illustrates a possible structure of the Exceptions Table.

FIG. 18 shows a record of transaction checks that are used in defining a role.

DETAILED DESCRIPTION OF EMBODIMENTS

Overview

Figure 1:
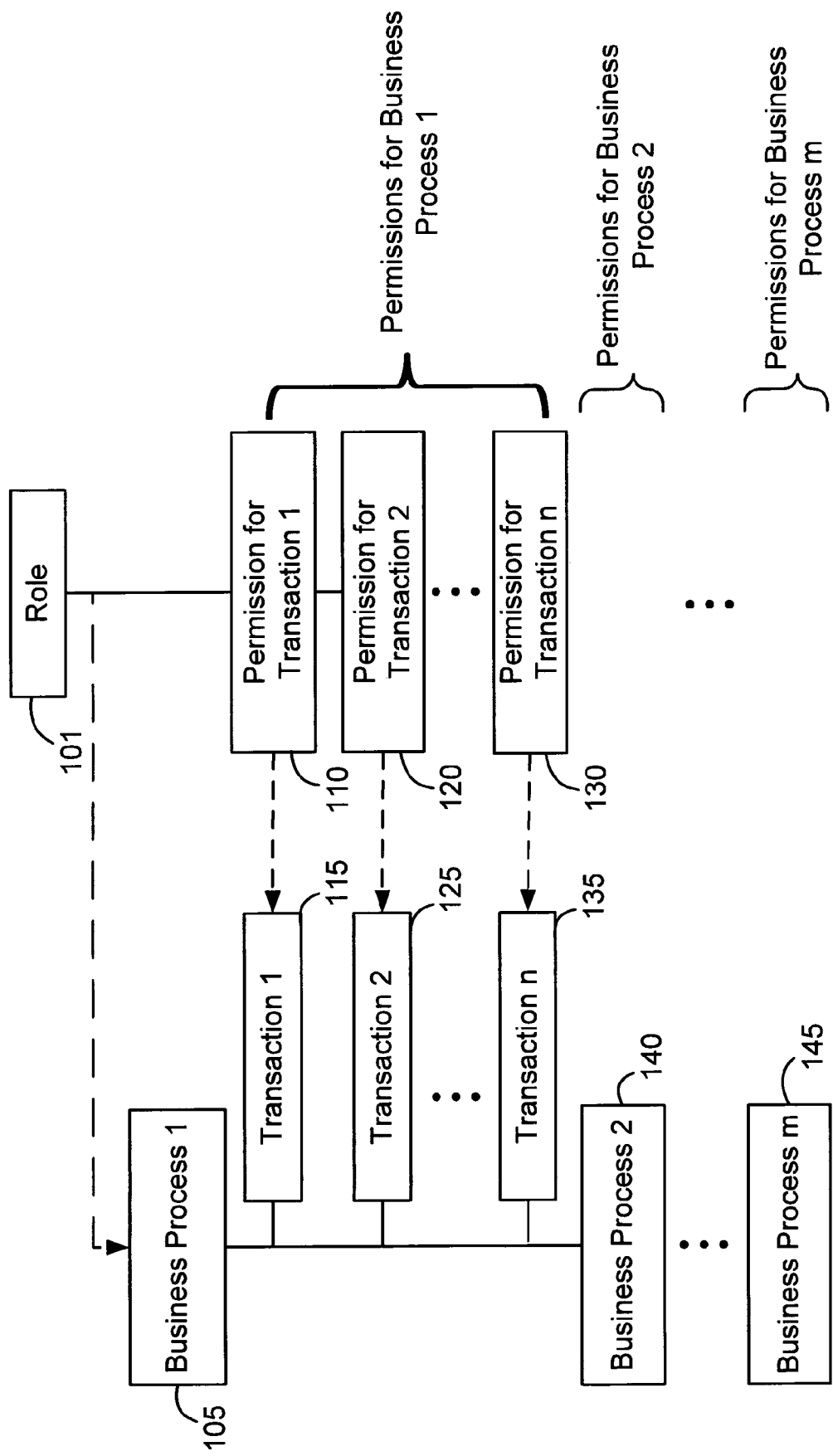
FIG. 1 is an illustration of a permissions model in a generic e-business system.

Modern e-business systems have the functionality of granulated access control enabling a detailed set of permissions to be granted to a user or a group of users in using the system's resources.

This set of permission requires tight supervision which can require a time-consuming effort of a human operator. Different e-business system vendors might use different terminology regarding the features governing the access control in the system; however the key principles are common. The generic terms related to this functionality will be:

Transaction: a set of functions or procedures in an e-business system that achieves a meaningful logical result within the workflow of a business operation.

Business process: a sequence of transactions that make up a workflow of a logically accomplished business operation.

Role: a business function of a user or a group of users in an organization reflected in a set of permissions to execute certain business processes and transactions within e-business systems.

Permission Check: is an operation that checks if a transaction has the correct parameters to permit its execution.

Because of the complexity of the internal implementation of an e-business system there is often a challenge in identifying the exact subset of low-level transactions involved in its execution. In addition, often there is integration with external systems and custom-developed transactions that need to be assigned the right permissions in the context of the relevant groups of users. The challenge is therefore the amount of knowledge of low-level transactions, customized transactions and integrations with the external systems that the security person responsible for the e-business application needs to have in order to effectively configure and troubleshoot the permissions for the transactions while maintaining the adequate level of security within the e-business system. As a result, there is no predefined list of permissions that has to be verified while executing the business process.

A limitation of existing products for permission management is that they cannot identify the set of permissions required for the successful execution of the transactions comprised in a customized business process in an e-business system. These limitations have two implications on the possibility of adequate permissions configuration within an e-business system: on one hand unnecessary permission can be given to certain users, and on the other hand there could be required permissions not given to the users executing certain transaction thus preventing the business process execution.

Embodiments of the present invention provide a user-friendly system, referred to below as a Verification Tool, and methodology enabling effective validation of permissions configuration in an e-business system while reducing the time otherwise required for this purpose. These embodiments enable a user with limited experience and knowledge of the verified e-business system to make effective use of the disclosed Verification Tool.

Embodiments of the invention are based on using the logs generated by an e-business system and reflecting the permission checks invoked while executing the transactions comprised in a business process. These embodiments make use of these logs collected in a specially configured reference system in order to verify the permissions in the target system. The reference system may be the e-business system itself, operating in a test configuration. Alternatively, the reference system may comprise a copy of all or part of the e-business system under test, in server, system or client configuration. In any event, for reliable results, the reference system should run the same software version(s) and have the same system configuration as the e-business system under test.

One embodiment of the invention is a method to verify the permissions for the roles and profiles configured in an e-business system. (A role is primarily a functional description of authorizations that are granted to a certain person or people. The technical realization of the role, in the form of concrete authorizations, is achieved through an authorization profile associated with the role.) The method includes creation of reference data by the use of a dedicated reference system. The reference system is configured with a profile (or role) that has permissions to execute all transactions in the scope of the verification project and is configured to provide the maximal possible level of detail in the logs. (For example, in SAP ECC systems, an authorization object P_ABAP is used in certain business processes. This object has a field named COARS for specifying the degree of simplification to be used for authorization checking Setting COARS=1 will give a maximal level of detail in the log.)

The business processes in the scope of the verification project are executed in the reference system with the resulting logs being saved for subsequent processing. The logs are processed by manual and/or automatic deletion of the irrelevant data and saved in the database for use as reference data for the verification project. The data saved in the reference database is rearranged to enable presenting it in a user-friendly way during the verification process.

In the verification phase of the method, the permissions for the roles in the target system are compared with the corresponding permissions in the reference data. The discrepancies between the reference data and the permissions in the verified target system are automatically analyzed and presented in a user-friendly way to human operator.

Another embodiment of the present invention comprises a system providing a graphical user interface as well as the logic behind it to facilitate the use of the disclosed permissions verification method. The core of the system is a reference database which is created and updated for each new verification project. The system provides a number of graphical user interfaces for the different operations done with the help of the system.

The first graphical user interface provides a user-friendly way to map the business process implemented in the verified system which is in the scope of the verification project.

Another graphical user interface is an editor enabling manual and automatic processing of a raw log collected from the reference system, saving the processed log in the reference database and its mapping to the preconfigured business processes. The automatic processing is done with the use of exceptions tables which are maintained and updated by the user.

Yet another graphical user interface guides the user through the verification process by fetching the relevant data views from the reference database and presenting it to the user. Subsequently, following a trigger from the user, the system executes the comparison with the actual verification process and presents the results to the user.

A comparison engine is a yet another part of the system which is driven by the system's graphical user interface. The comparison engine has an interface with the reference database and the verified system.

One embodiment of the present invention is its implementation for the products by SAP AG. This embodiment is mentioned separately due to the special structure and limitations of the logs generated by SAP products.

Embodiments of the invention thus provide an innovative approach for the verification of permissions in a complex modern e-business system. The disclosed methods provide a generic approach to handle heavily customized implementations of business processes without the need for analyzing the source code of the core e-business system or its customization. Therefore the disclosed system can be operated by a user with only basic general knowledge of the administration and authorization of the verified e-business system. The system provides a replacement for otherwise tedious and error-prone manual processes executed by a human operator.

In other embodiments of the invention, the same facilities that are used for verification of permissions can be used in creating and defining roles to participate in actual business processes that are to be executed in an e-business system. In these embodiments, reference data is similarly created by merging records from logs of the permission checks with respect to transactions in the business process that have been executed in the reference system. The system operator then sets the permissions for at least one role that will perform the transactions during the execution of the business process in the actual e-business system. In this way, the operator can ensure that the role will have precisely the permissions that are necessary for the transaction or transactions in question, without superfluous permissions that could otherwise compromise security.

FIG. 1 shows the interrelation between a role, a business process, a transaction and their permissions in a generic e-business system covered by the present invention. The hardware system environment in which these interactions take place is shown below in FIG. 16.

A Role 101 is entitled to execute Business Processes 105 and 140. In the illustrated embodiment the Business Process 105 contains, among others, the Transactions 115, 125 and 135. In order for the Role 101 to be able to execute the Business Process 105 it needs to have the permissions for the Transactions constituting this Business Process.

For this purpose the Role 101 contains a set of Permissions 110, 120 and 130, which correspond to Transactions 115, 125 and 135 of the Business Process 105. The method disclosed in the present patent application involves the use of a reference system to obtain the data subsequently involved in configuration of the target system. The reference system is configured with the same code set as the target system; however the permissions on the reference system are configured with the least possible level of restriction.

The implementation of setting up the least possible level of permissions depends on a specific e-business system. In general, a role should be created that would include permissions for all the business processes that are in the scope of the verification project.

Some e-business systems have permissions that limit the level of details of the logs that are generated during the business process execution. It is important to ensure that these permissions are not assigned to the role configured with the least possible level of restriction in the reference system.

The concept of the method involves logging the permission checks required for the execution of a certain business process in the reference system. Subsequently, the log is processed to obtain a filtered reference snapshot file. In the last step of the method the reference snapshot file is compared with the compatible view of the permissions for a role in the target system and the parameters in the target system can be verified and corrected.

Verification of Permissions

Figure 2:
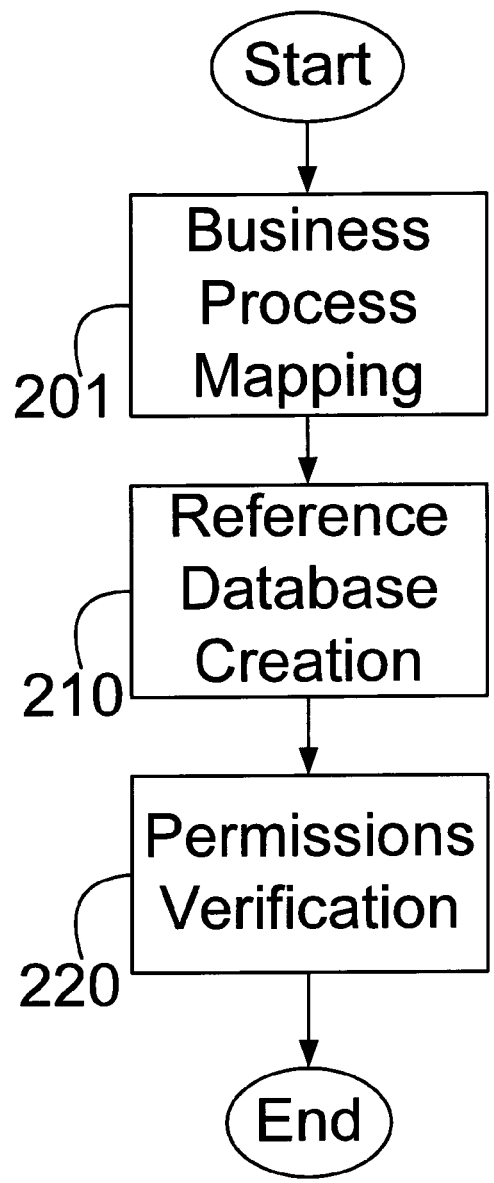
FIG. 2 is a flow chart showing the sequence of the permissions verification project stages.

FIG. 2 shows a high-level approach to the e-business system permissions verification project execution. The Step 201 refers to the phase of the project where the business process and roles implemented in the e-business system are mapped and documented. The mapping process is covered in more detail in FIG. 3. Further in FIG. 2 the Step 210 covers the process of creating the Reference Database which will be used in the verification process. This step can be repeated a few times through the time span of the project for the purpose of updating and improving the reference data. Step 210 of FIG. 2 is disclosed in more detail in FIG. 5. The actual verification process is done in the step 220. In this step the permissions for the roles of interest in the target system are compared with the corresponding entries in the Reference Database created in Step 210. The verification algorithm is covered in more detail in FIG. 5.

Figure 3:
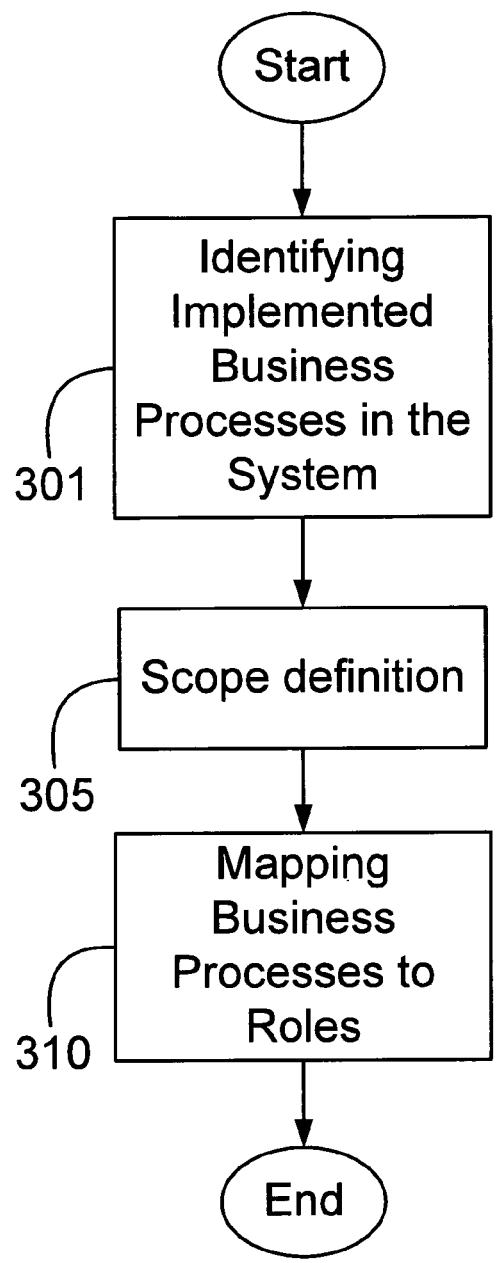
FIG. 3 is a flow chart showing the steps of mapping Business Processes to Roles in the Verification Tool.

FIG. 3 illustrates the process of mapping the Business Processes to the Roles in the system. Step 301 refers to the identification of business processes in the organization. This could be done based on existing documentation of the deployed e-business system or by a series of interviews with the users of the system. Step 305 corresponds to the definition of the scope of the verification project. The scope of the project is limited by the set of business processes and roles that are of interest. Step 310 covers the mapping of the Business Processes to the Roles as shown in more detail in FIG. 8B.

Figure 4:
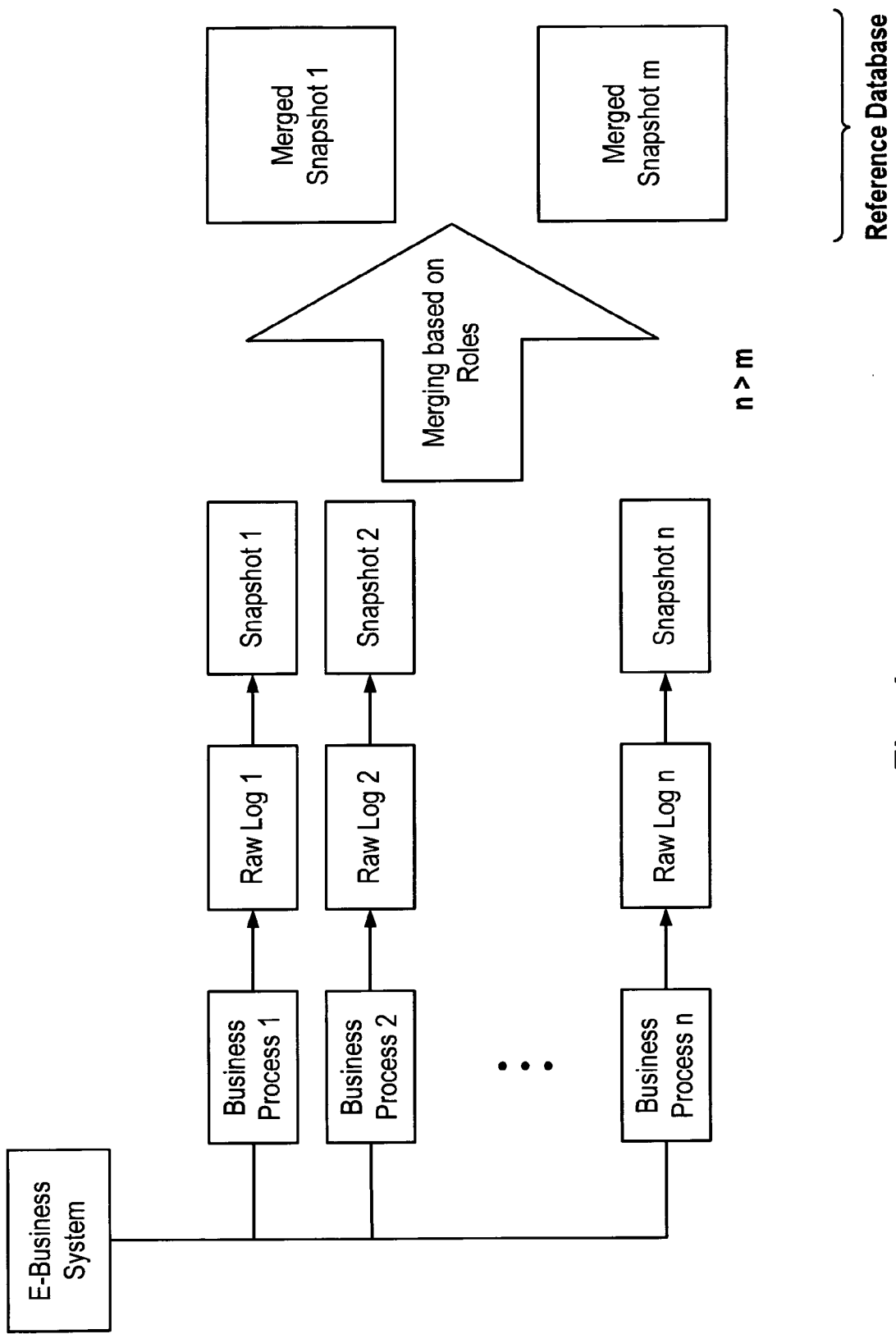
FIG. 4 shows the flow of data in the process of creating Merged Snapshots from Raw Logs.

FIG. 4 shows the logical sequence of actions involved in creating the Reference Database. Initially, a human operator will execute the sequence of transactions (using the corresponding screens and menus) in the system which will produce the detailed log, containing the record of the permission verification operations invoked in the process of the transactions sequence execution. The resulting log will be saved for subsequent processing and we will refer to it as a Raw Log. The Raw Log contains the information required for the eventual verification purpose but also has a lot of records not needed for the permission verification purpose. In the next step the Verification Tool processes each Raw Log by removing the irrelevant information and saves the resulting data into the database table which we define as a Snapshot. Effectively, the Snapshot contains the distilled version of the information in the Raw Log. There is one Snapshot created for each Raw Log. The process of Raw Log conversion into a Snapshot table is done through the Snapshot Editor which is a part of the Verification Tool disclosed herein.

While processing Raw Logs in Snapshots for a plurality of Business Processes one may notice a consistent set of permission checks that is eliminated from each Raw Log in the cleansing process. In order to optimize this process the Verification Tool maintains an Exceptions Table which will store the details of the permanent set of permission checks to be deleted from a Raw Log in the Snapshot creation process. The content of the Exceptions Table can be updated for the needs of a particular Business Process where a certain permission check is or is not meaningful. The permission checks defined in the Exceptions Table can be automatically purged from the Raw Log in the Snapshot creation process. Additional unneeded information in the Raw Log may be deleted manually using the Snapshot Editor.

Eventually we have a set of Snapshot tables, each pertaining to a Business Process. In its turn, as discussed in the description of FIG. 3, the Business Processes are mapped to Roles. Because the verification process is driven by the Roles we need to combine the information related to a certain Role across multiple Business Processes. The Verification Tool will automatically combine the Snapshots pertaining to a certain role into the final Merged Snapshot. The Merged Snapshot can be a result of one or more Snapshots combined together. The structure of the Merged Snapshot is covered in the description of FIG. 6.

Figure 5:
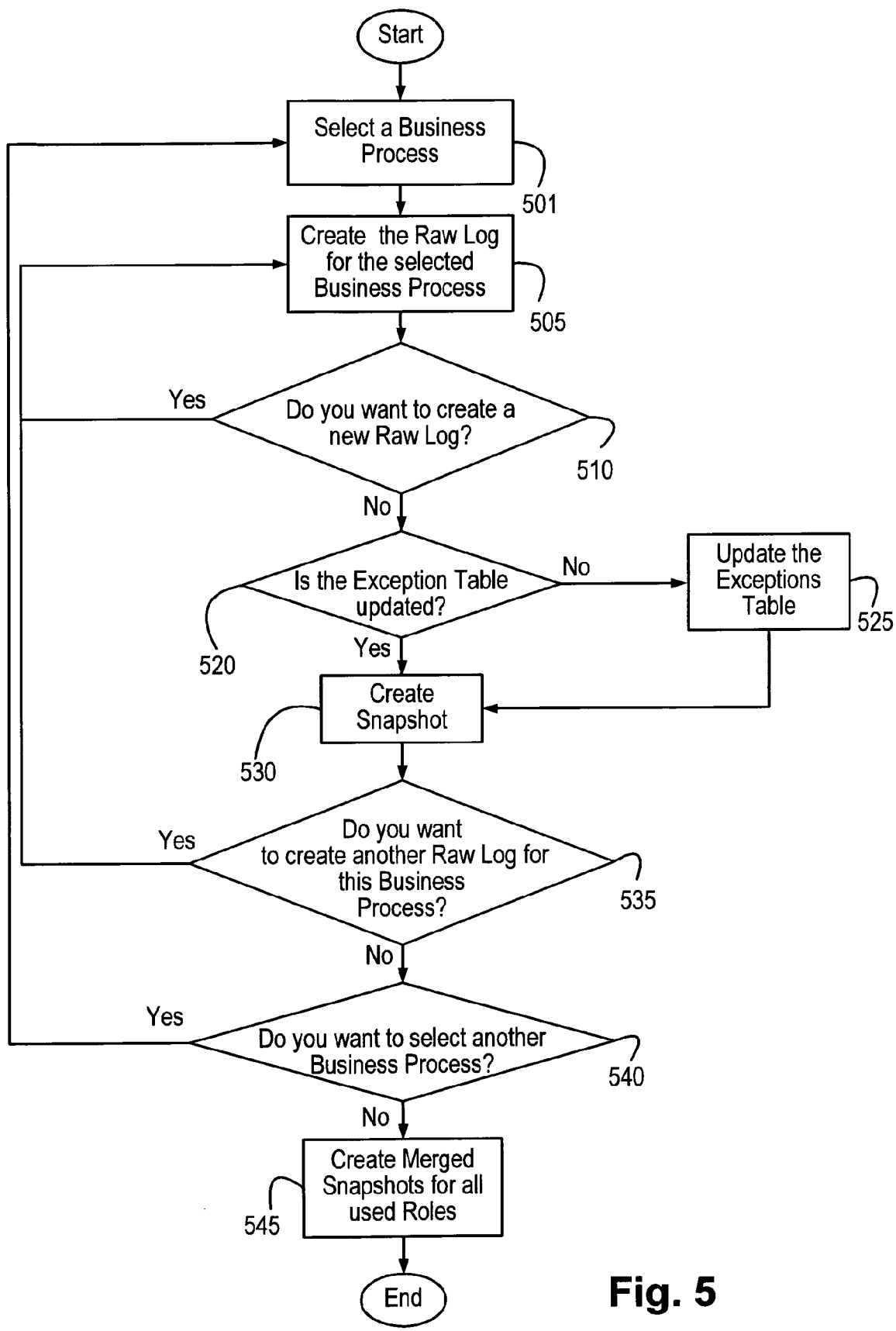
FIG. 5 shows a detailed flow chart with the steps of Merged Snapshots creation.

FIG. 5 shows the flow of the Reference Database creation process. In step 501 the system operator uses the documentation describing the scope of the project to choose a Business Process with which to start the Raw Log recording by the Verification Tool. In step 505 the Verification Tool captures the Raw Log file for the selected Business Process. In step 510 it is possible to redo the capture from step 505 in case of a human error in execution of the selected Business Process in the e-business system. In step 520 the Verification Tool checks the Exceptions Table to see if the checks and parameters that are to be excluded from the Snapshots are already there. If missing exceptions are identified they can be added in step 525.

After the Exceptions Table is updated, the Verification Tool creates a snapshot in step 530 using a sequence of automatic and manual cleansing processes. In the automatic phase the data defined in the Exceptions Table is deleted from the Raw Log. Then additional entries can be deleted manually. The entries to be deleted are generally added to the Exceptions Table if the system operator expects them to recur in other Raw Logs. An additional case in which the operator might want to add a permission to the Exceptions Table is when there is a permission that he or she explicitly does not want any Role to have.

In step 535 the operator has a choice to capture another Raw Log for the same Business Process. This is done if the initial Raw Log contained only a part of the end-to-end process. In other words, this is when a part of the Business Process wasn't followed when capturing the initial Raw Log. This can be done on purpose because of the limitations of a Business Process Execution.

In step 540 the operator can select another Business Process of interest to capture the Raw Log and create a Snapshot for it too. After all Business Processes in the scope of work are followed and captured into the Snapshots, the Verification Tool creates the Merged Snapshot by combining the data from different Snapshots pertaining to the same Role in step 545. The process of combining may be automatic or manual. Manual combining permits the process to be more controlled by the operator through the GUI of the Verification Tool.

Figure 6:
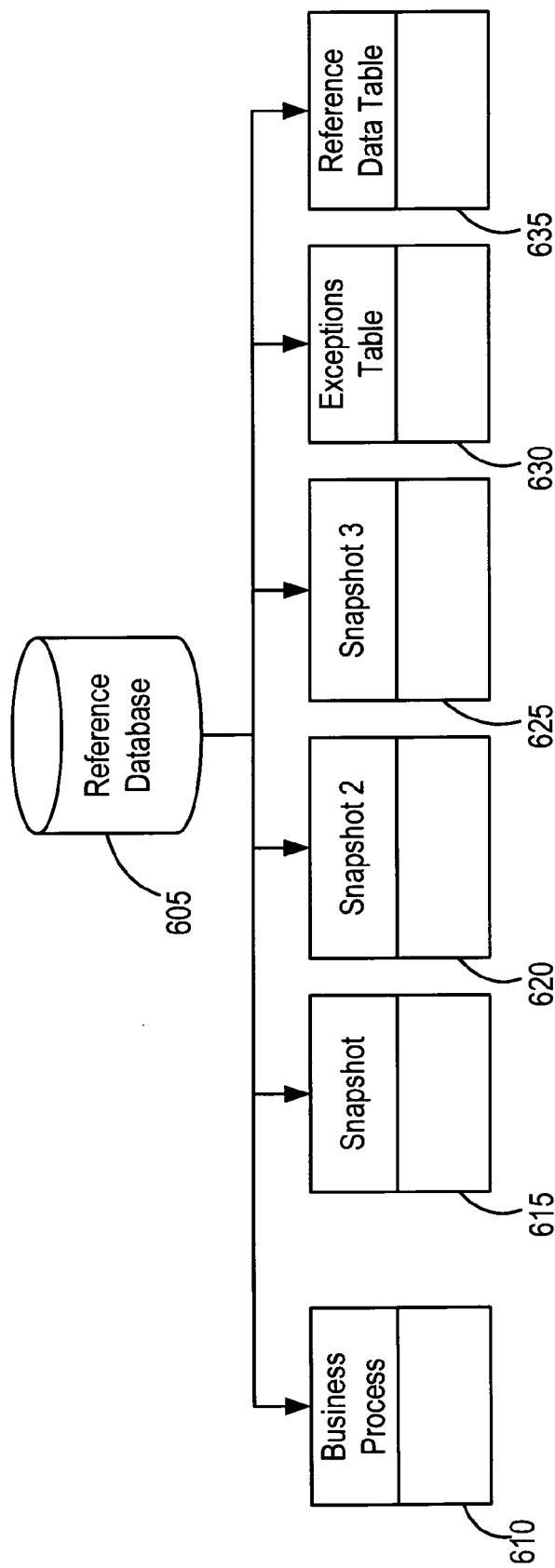
FIG. 6 shows the structure of a Reference Database.

FIG. 6 shows a possible structure of the Reference Data Table in the Reference Database. The eventual purpose of the Reference Database is to support the verification process. All the data required for this process is contained in Reference Data table 635. However it is usually difficult to obtain the data needed for the Reference Data table 635 without intermediate steps. The sequence of steps required for the Reference Data Table 635 calculation is shown in more detail in FIG. 8. The tables supporting the Reference Data calculation are 'Business Process' 610, 'Snapshot' 615, 'Snapshot 2' 620, 'Snapshot 3' 625, 'Exceptions table' 630.

Figure 7:
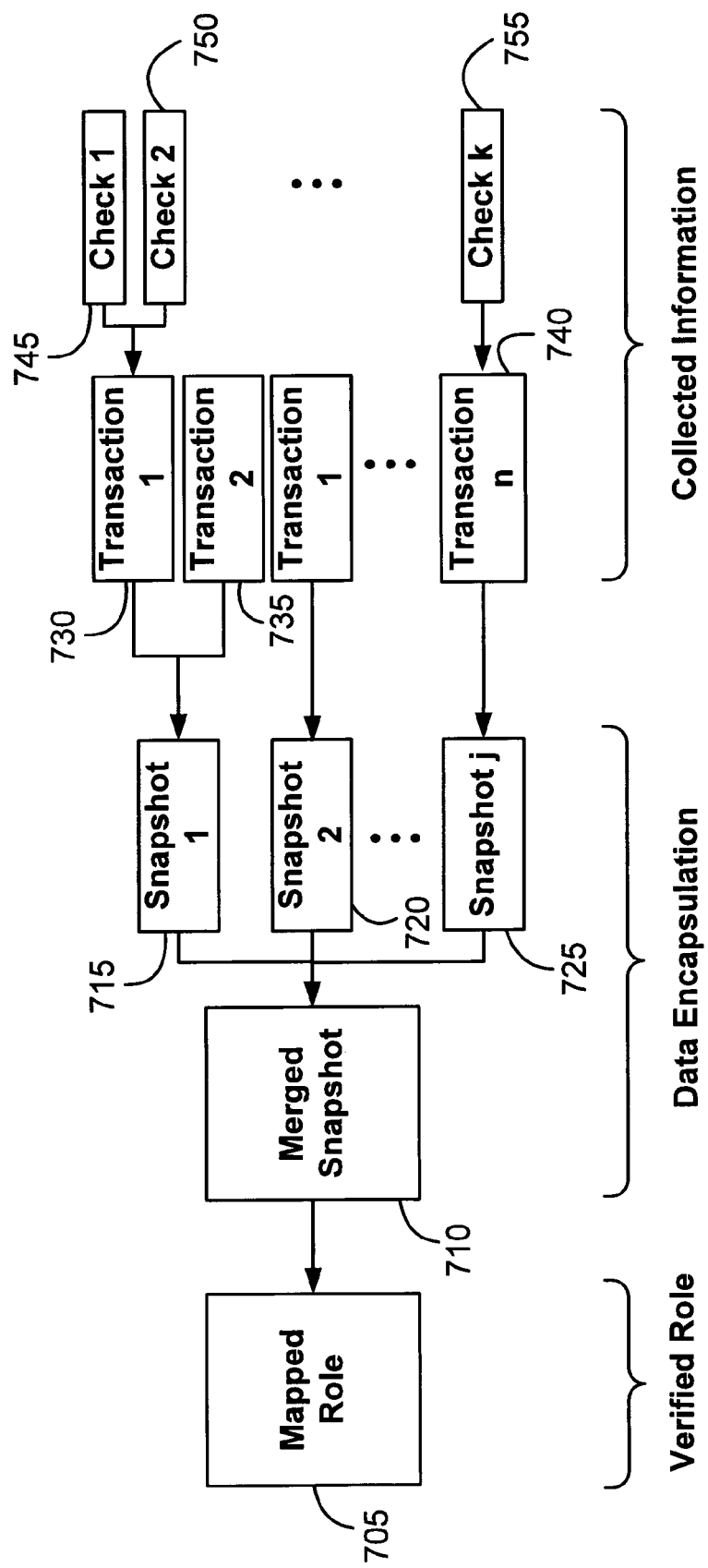
FIG. 7 shows the hierarchy of the elements of the data stored in the Reference Database.

FIG. 7 shows the high-level organization of the data in the Verification Tool, which is subsequently reflected in the structure of the Reference Data table. The eventual objective of the reference data collection is to enable mapping between the role that is being verified and the set of permission checks that are actually invoked while executing the Business Processes related to that role. The elements of the data structure shown in FIG. 7 include information collected from the logs: Transactions and Permission Checks; Data encapsulation parameters: Merged Snapshots and Snapshots; Verified Roles. Snapshots 715, 720 and 725 refer to the processed logs obtained while executing the Business Processes belonging to the Role. Each of the snapshots contains a plurality of transactions. Each of these transactions in its turn has a plurality of permission checks that were invoked during its execution. For our purpose we need to be able to unify the transactions and their permission checks with the corresponding parameters across multiple snapshots. This is achieved by creating the Merged Snapshot 710. For example, Transaction 1 appears as item 730 in Snapshot 1 (item 715) and as item 740 in Snapshot 2 (item 720). In Snapshot 1, Transaction 1 contains Permission Checks 1 and 2 (items 750 and 755) while in Snapshot 2 in the same Transaction contains Permission Checks 1 and 3 (items 760 and 765). For the verification purpose there is no need to maintain the linkage between a Transaction and the Snapshot containing this Transaction. The unified view of Permission Checks 1, 2 and 3 belonging to Transaction 1 is achieved by merging Snapshot 1 (item 715) and Snapshot 2 (item 720) into a Merged Snapshot (item 710). The Merged Snapshot 710 is mapped to the actual Role 705.

Figure 8A:
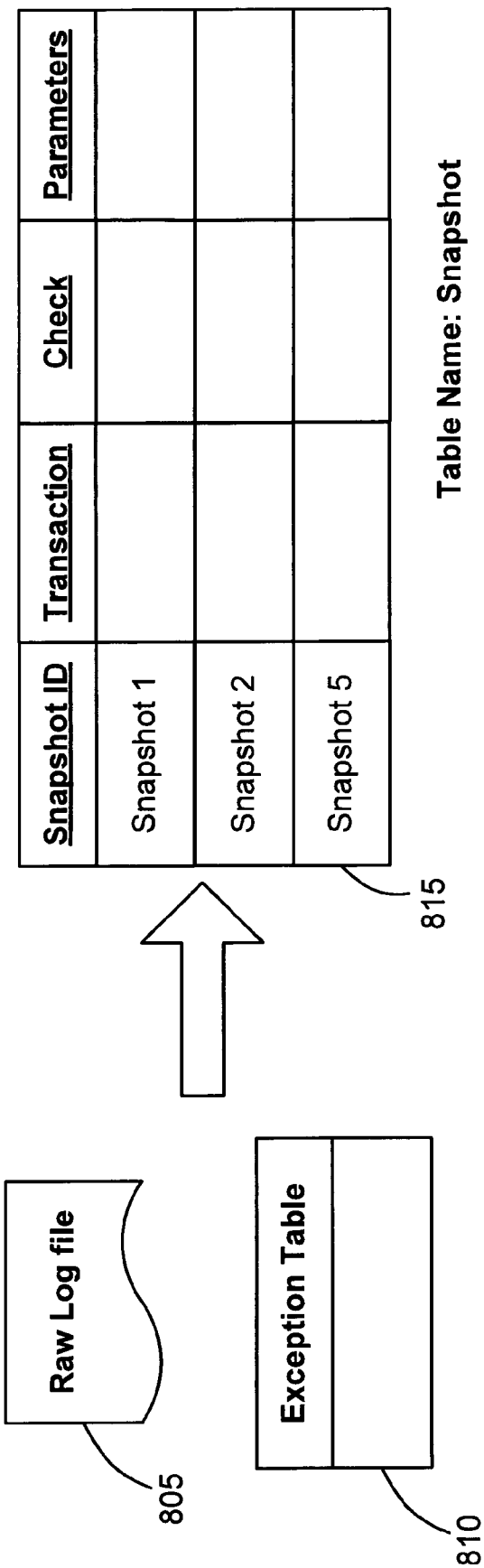
FIG. 8A, FIG. 8B and FIG. 8C show the sequence of steps of data processing in the Reference Database used to produce the Roles to Business Processes Mapping and Snapshots.
Figure 8B:
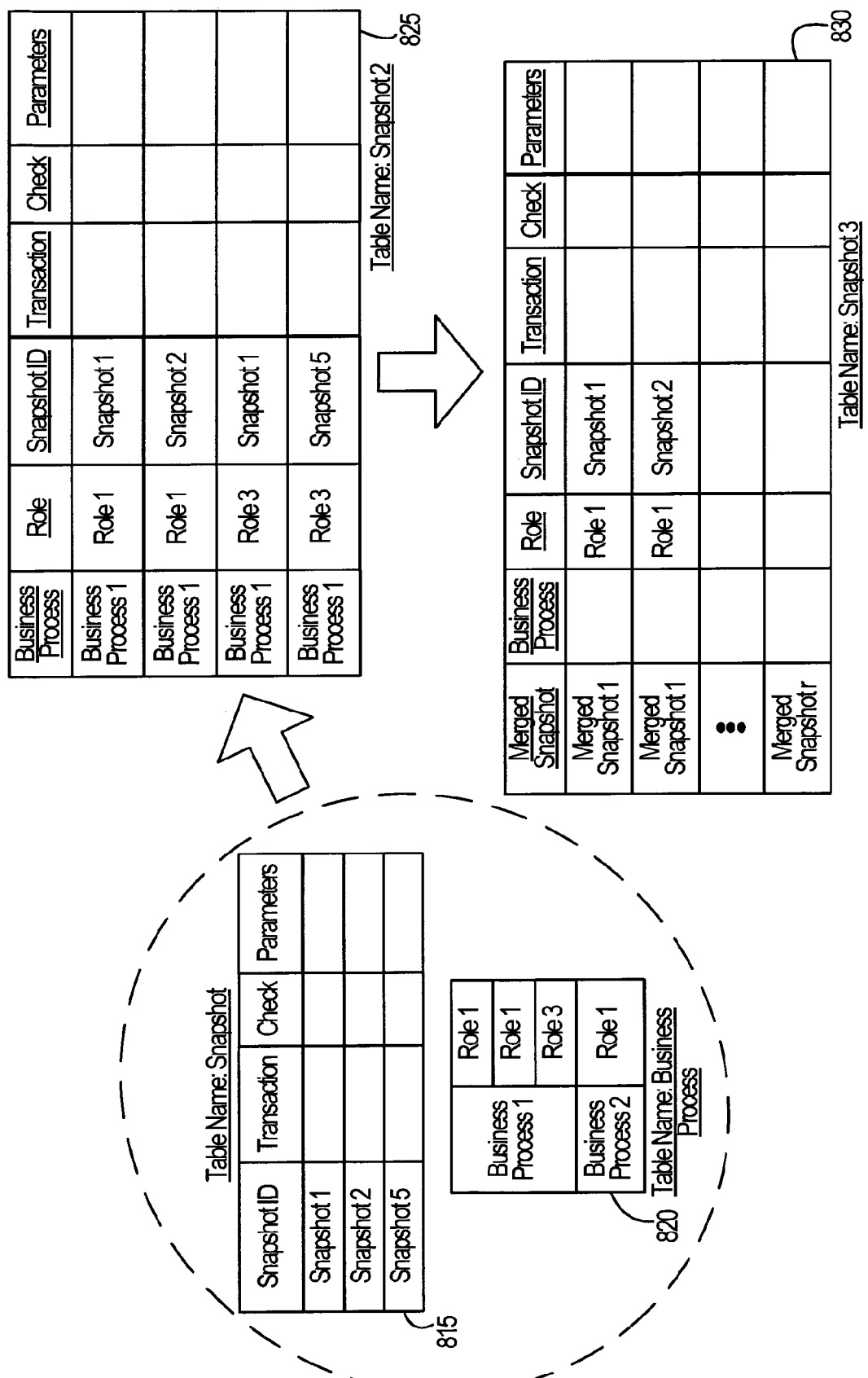
Figure 8C:
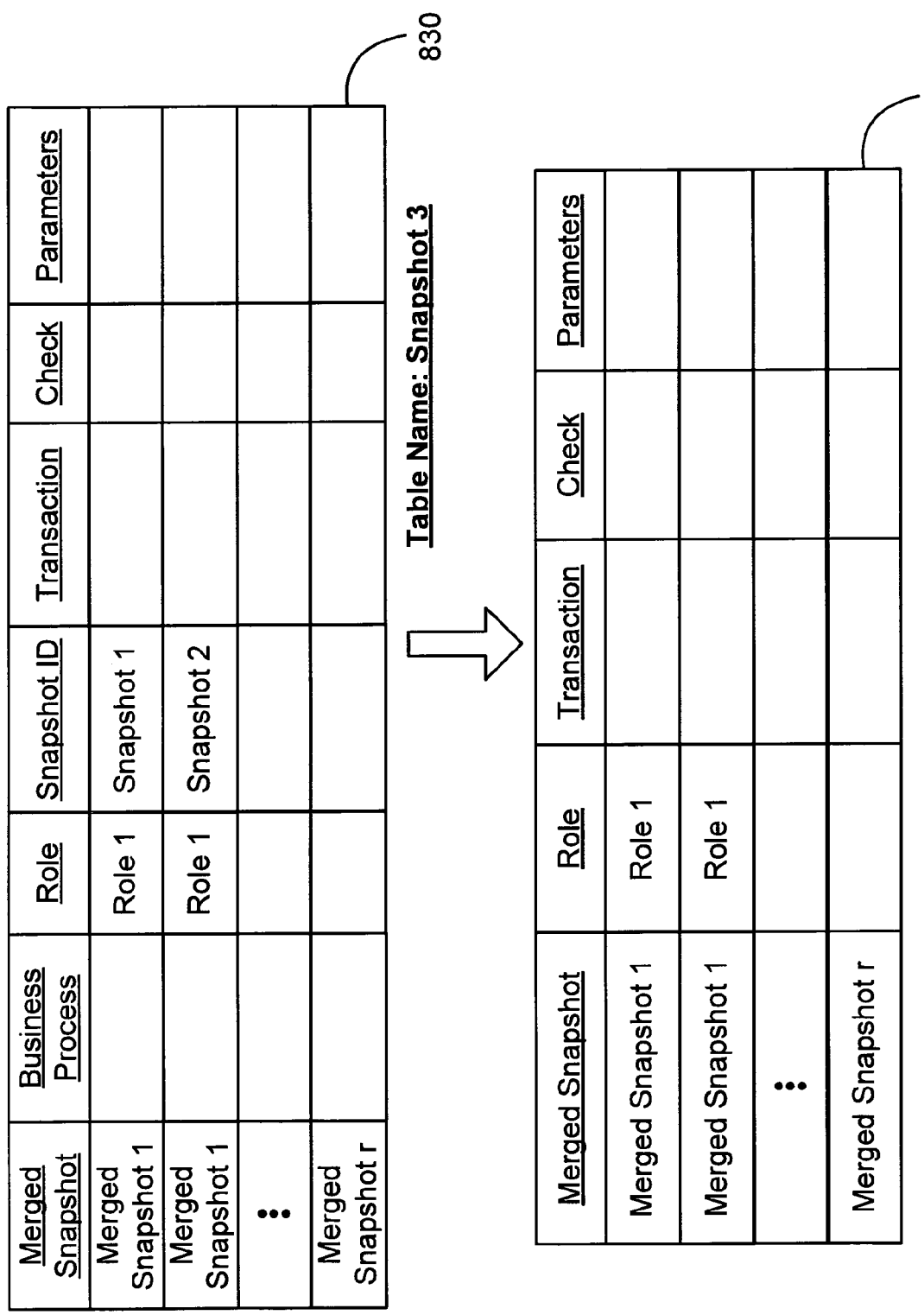

FIGS. 8A, 8B and 8C show the sequence of tables in the Reference Database that are updated in the process of generation of data for the Reference Data Table 635 shown in FIG. 6, and disclosed in more detail in FIG. 8C. FIGS. 8A, 8B and 8C illustrate the steps of the Reference Data table generation process. The "Business Process" table 820 shown in FIG. 8B is generated by identifying the Roles that are entitled to execute the Transactions making up the Business Processes in the scope of the verification. This is done by querying the target system through an API and manually accomplishing the selection of the Roles in the scope of the verification project using the Verification Tool's Business Process Editor as shown in more detail in FIG. 15. Raw Log files 805 in FIG. 8A are created for each of the Business Processes in the scope of the verification. The Raw Log file is processed using an Exceptions Table 810 to delete from it information stored in the Exceptions Table. The structure of the Exceptions Table 810 is shown in more detail in FIG. 10. The resulting data is stored in the table 815 "Snapshot" of the Reference Database as shown in FIG. 8A.

Figure 15:
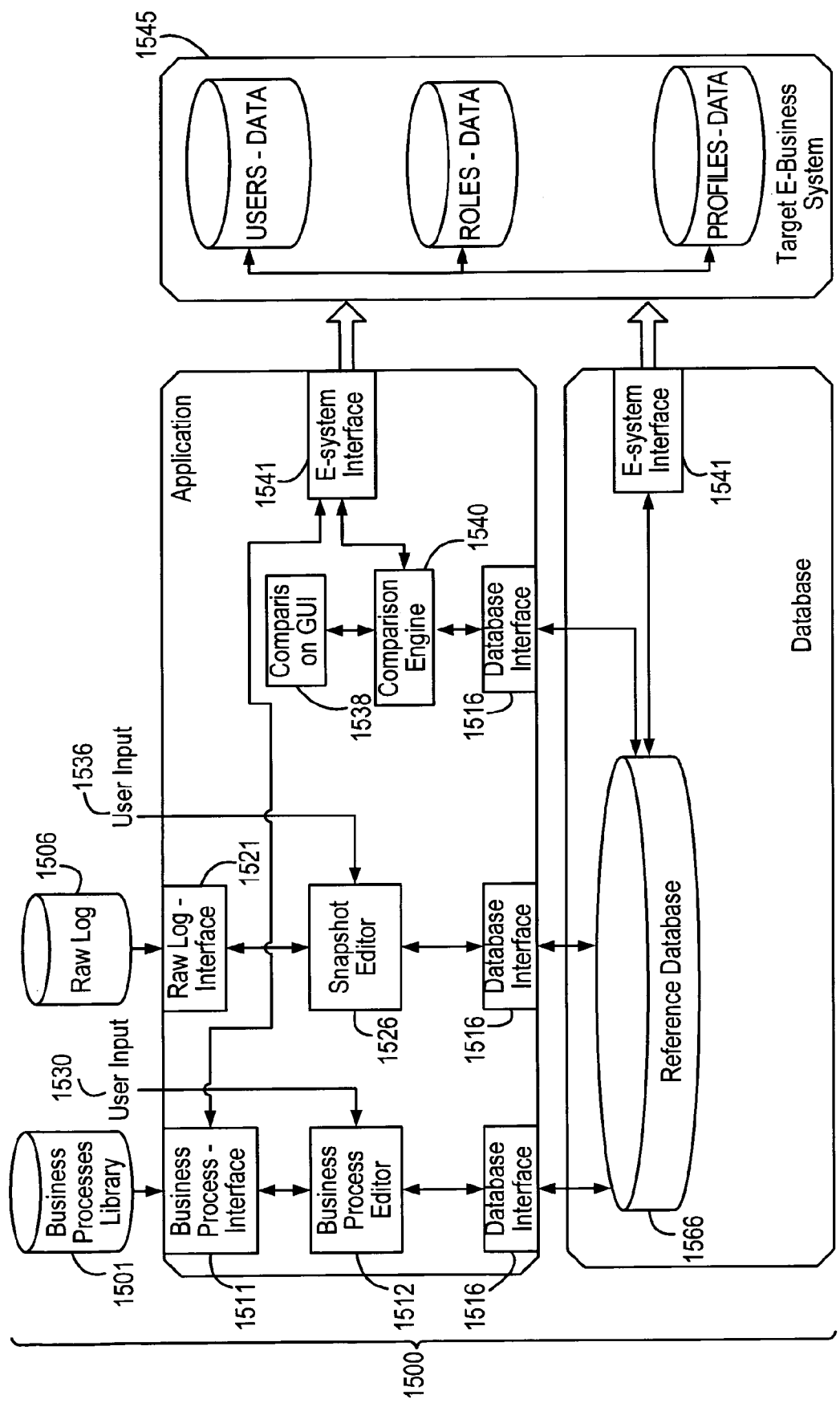
FIG. 15 shows the architecture of the Verification Tool.

The table 815 "Snapshot" and the table 820 "Business Process" in FIG. 8B can be manually processed together using the Snapshot Editor of the Verification Tool's GUI as shown in FIG. 15, or they may be processed automatically by the Verification Tool. The Snapshot ID in table 815 is manually assigned to a Business Process in the table 820 with the result saved in the table 825 "Snapshot 2" as shown in FIG. 8B. The table 830 "Snapshot 3" shown in FIG. 8B is obtained from the table 825 "Snapshot 2" by adding a column "Merged Snapshot" which contains the number of the Merged Snapshot that is being generated. The number of the Merged Snapshot is equal to the number of the Role of a Snapshot in the table 825. FIG. 8C shows the table 835 "Reference Data Table," which is the eventual table used as a source of reference data in the verification process. Table 835 "Reference Data Table" is obtained from the table 830 "Snapshot 3" by deleting repeating entries of the Transactions with their corresponding Permission Checks and Parameters under the same Merged Snapshot. The columns "Business Process" and "Snapshot ID" are not copied from the table 830 "Snapshot 3" into the table 835 "Reference Data Table" because they are not needed in the verification process.

FIG. 9 shows the structure of the Reference Data Table. The structure of the table follows the Role to Transaction mapping as described in FIG. 7. The content of the Reference Data Table serve two major purposes. The first one is to enable the Verification Tool GUI to fetch the view of the Permissions for the Role. The second objective is to give the user a way to combine different Snapshots into a Merged Snapshot. As discussed above the same Snapshot can be mapped to different Business Processes and therefore can be relevant for different Roles. The columns of the Reference Data Table are "Merged Snapshot ID" (item 905), "Mapped Roles" (item 910), "Transaction" (item 925), "Check"—referring to Permission Check (item 930), and "Parameters" referring to Permission parameters (item 935).

Figure 10:
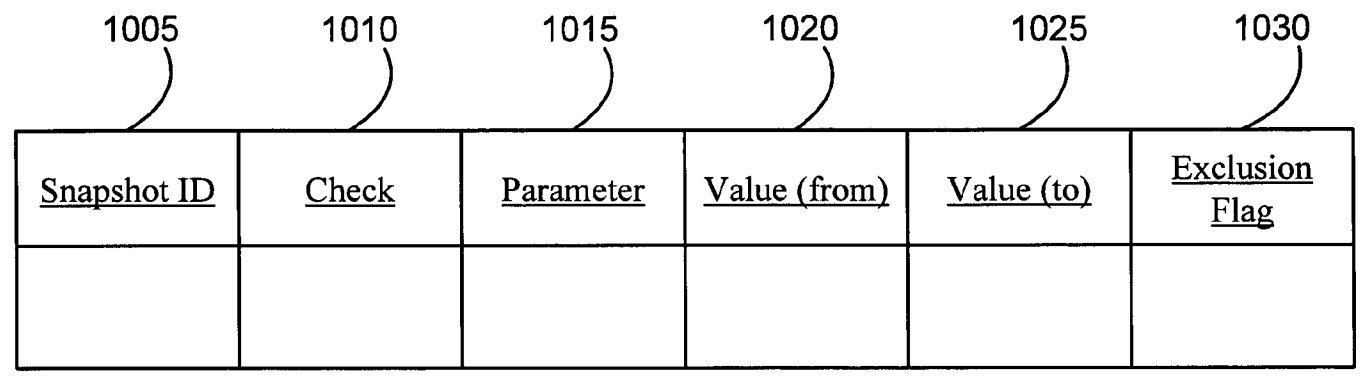

FIG. 10 shows the structure of the Exceptions Table, which is the second table in the Reference Database. The Fields of the Exceptions Table are "Snapshot ID" 1005, "Check" 1010, "Parameter" 1015, "Value (from)" 1020, "Value (to)" 1025 and "Exclusion Flag" 1030. The value in the field "Parameter" contains the names of the Parameters corresponding to a Permission Check in the field "Check". The values in the fields "Value (from)" and "Value (to)" define the range of values that a Parameter can have.

Figure 11:
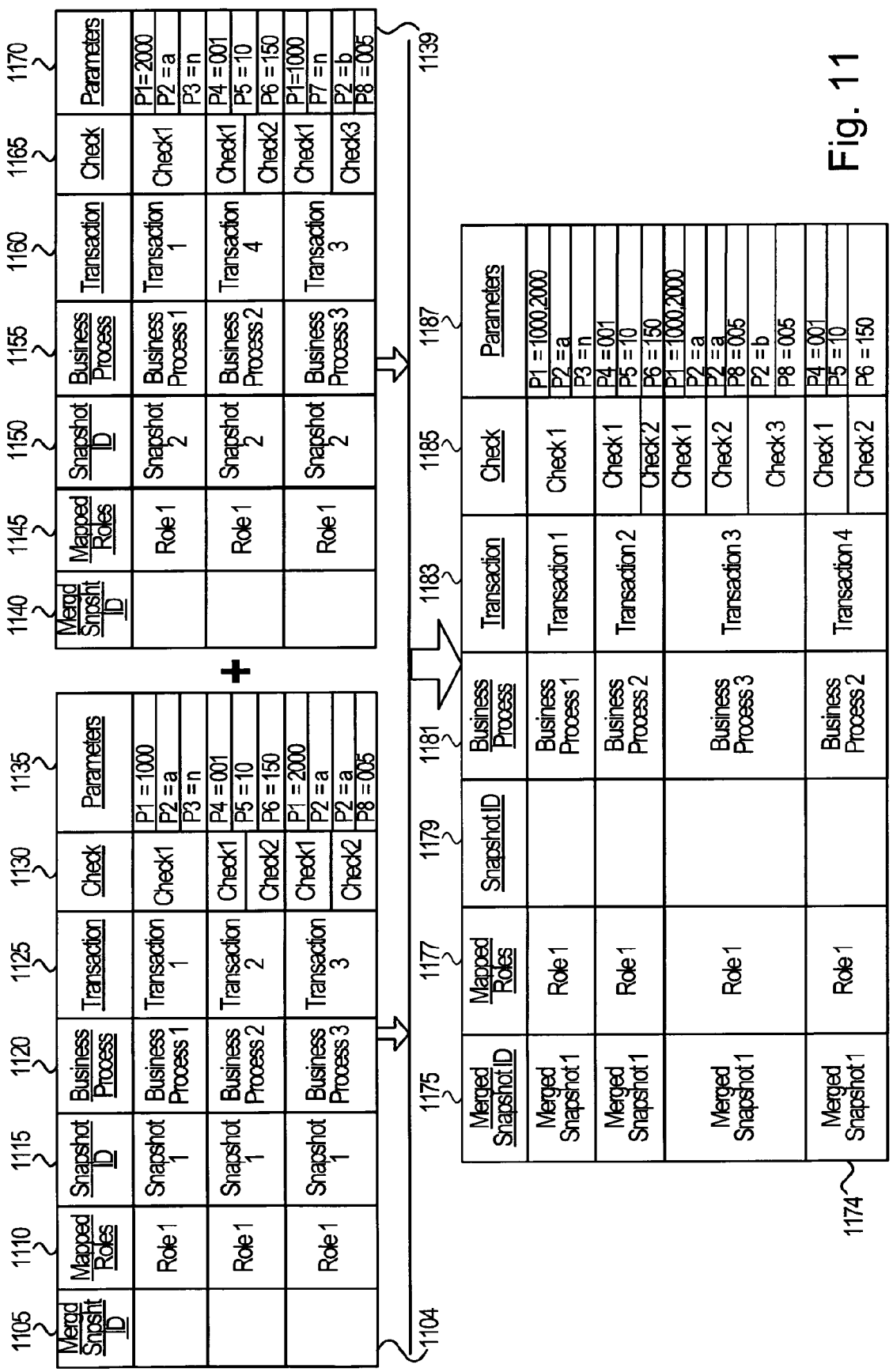
FIG. 11 illustrates the process of merging two Snapshots into a Merged Snapshot.

FIG. 11 shows the process of merging a number of Snapshots into a Merged Snapshot. The first step in merging multiple Snapshots into a Merged Snapshot is identifying Transactions appearing in more than one of the Snapshots to be merged. In different Snapshots the same Transaction can have different sets of Permission Checks and their parameters attached to it. In the second step, the Verification Tool creates a unified list of all Permission Checks with all of their possible parameters involved in executing the Transactions identified in the first step for the Snapshots to be merged. This unified set of Permission Checks is stored in the field attached to the relevant Transaction. In the third step, the Verification Tool combines the parameters of the Permission Checks in the list created in the second step. All Transactions that appear in one Snapshot only will be added to the resulting Merged Snapshot without changing the set of Permission Checks and their parameters.

FIG. 11 further provides an illustration of merging a Transaction existing in two Snapshots into the Merged Snapshot. "Transaction 3" in Snapshot 1104 contains Permission Checks "Check 1" and "Check 2", while in Snapshot 1139 the same "Transaction 3" involves "Check 1" and "Check 3". The merging process will create "Transaction 3" in the Merged Snapshot 1174 with the set of Permission Checks: "Check 1", "Check 2" and "Check 3".

In the next layer, the Verification Tool merges the Parameters for matching Permission Checks pertaining to the same Transaction in the merged Snapshots. For example, in Snapshot 1104 Permission Check 1 for Transaction 3 has Parameter "P1=2000", while in Snapshot 1139 Permission Check 1 for Transaction 3 has Parameter "P1=1000". Therefore in Merged Snapshot 1174 Permission Check 1 for Transaction 3 has Parameter "P1=1000, 2000". As we said, Transactions that exist in only one of the Snapshots to be merged will appear in the Merged Snapshot without change—with all the Permission Checks and Parameters as in the Snapshot participating in the merging process. For example "Transaction 2" exists in Snapshot 1104 only, while "Transaction 4" appears only in Snapshot 1139. Both "Transaction 2" and "Transaction 4" with all the corresponding Permission Checks and Parameters will be added to the Merged Snapshot 1174.

Figure 12:
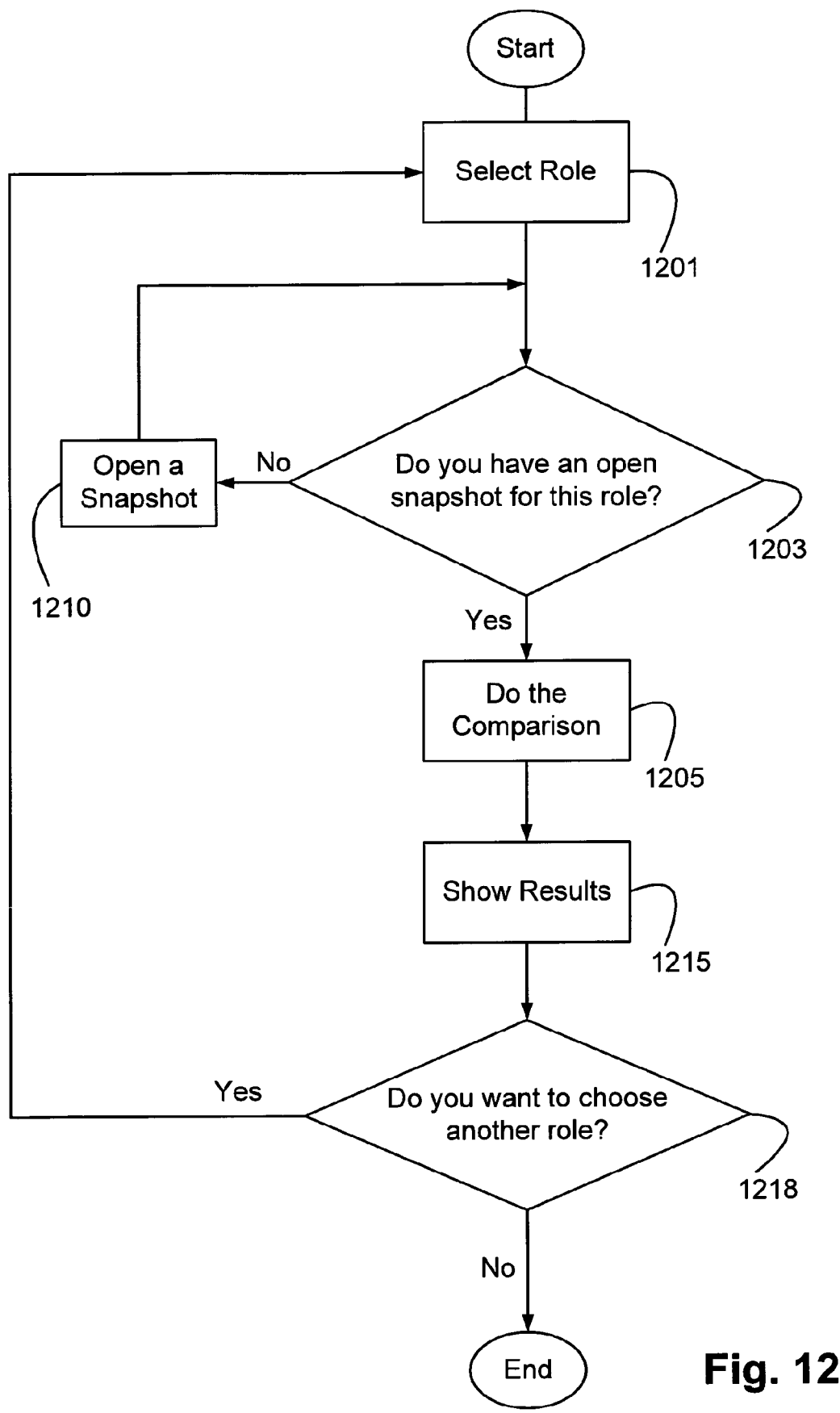
FIG. 12 is a flow chart showing the steps of the permissions verification process.

FIG. 12 shows the sequence of steps involved in the verification process executed with the use of the reference data collected and processed as described in the previous figures. In step 1201 the operator selects the Role from the target system to be verified. The operator relies on the e-business system GUI to get the view of the Permissions with their corresponding parameters and the values that are assigned to these parameters. In step 1203 the operator checks if the Merged Snapshot corresponding to the selected Role is opened in the verification program provided by the Verification Tool. If the Merged Snapshot is not open then the operator opens it in step 1210. Opening a Snapshot is accomplished by selecting the name of the selected Role in the GUI menu of the Verification Tool. As a result of this operation the operator will be presented with the view of the Role, permissions for that Role and their corresponding parameters with their values. The view can be seen as a filter applied to the data in the Reference Database. At this point the operator can see permission for the selected Role in the verified e-business system and in the reference system. Then in step 1205 the operator triggers an automatic comparison operation. In step 1215 the Verification Tool shows the operator the comparison results as described in more detail in FIG. 14A and FIG. 14B. In step 1218 the operator can choose to repeat the process for a different role or to quit the verification process.

Figure 13A:
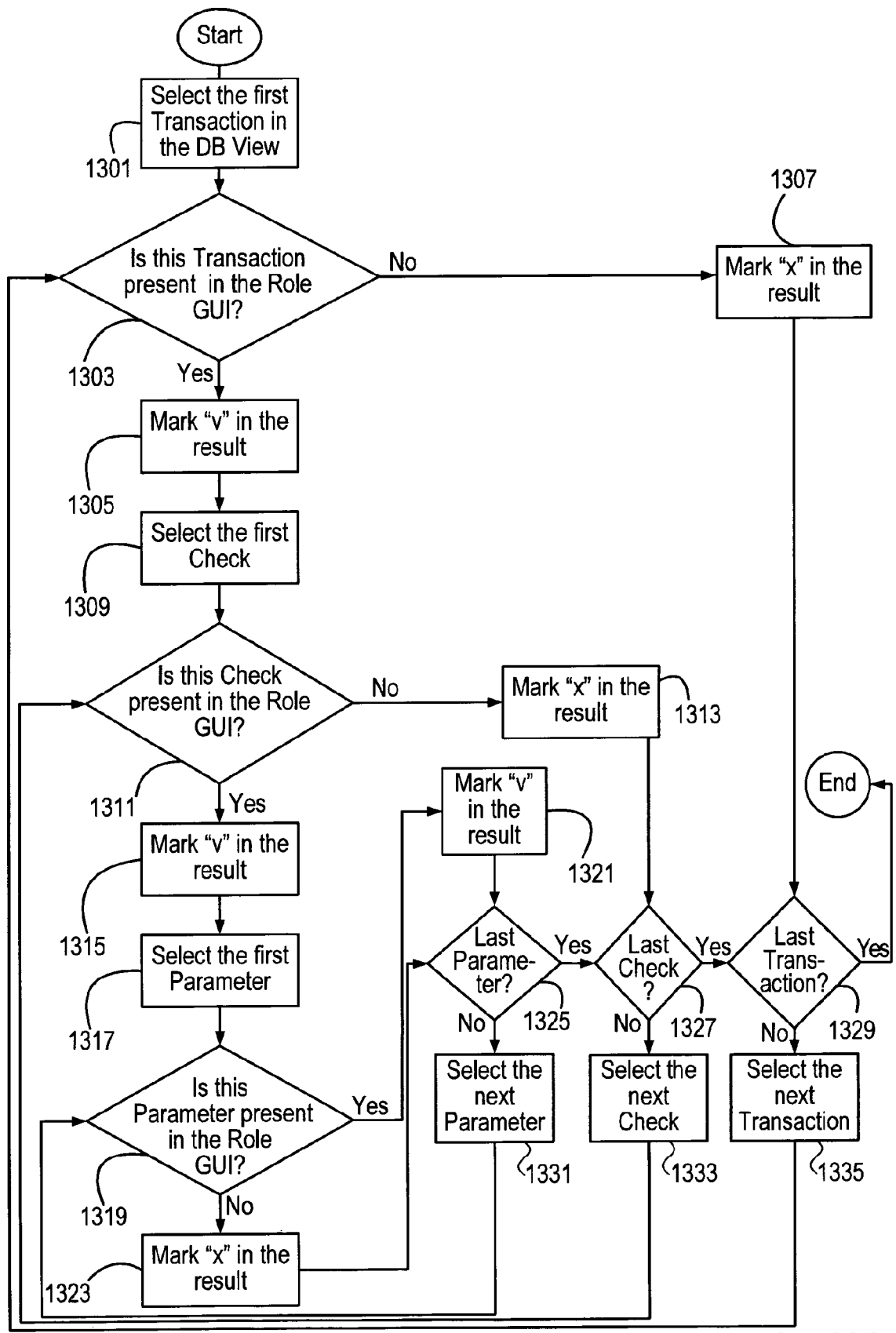
FIG. 13A is a flow chart describing a comparison algorithm for a generic e-business system executed on the Reference Data view and the verified Role table.
Figure 13B:
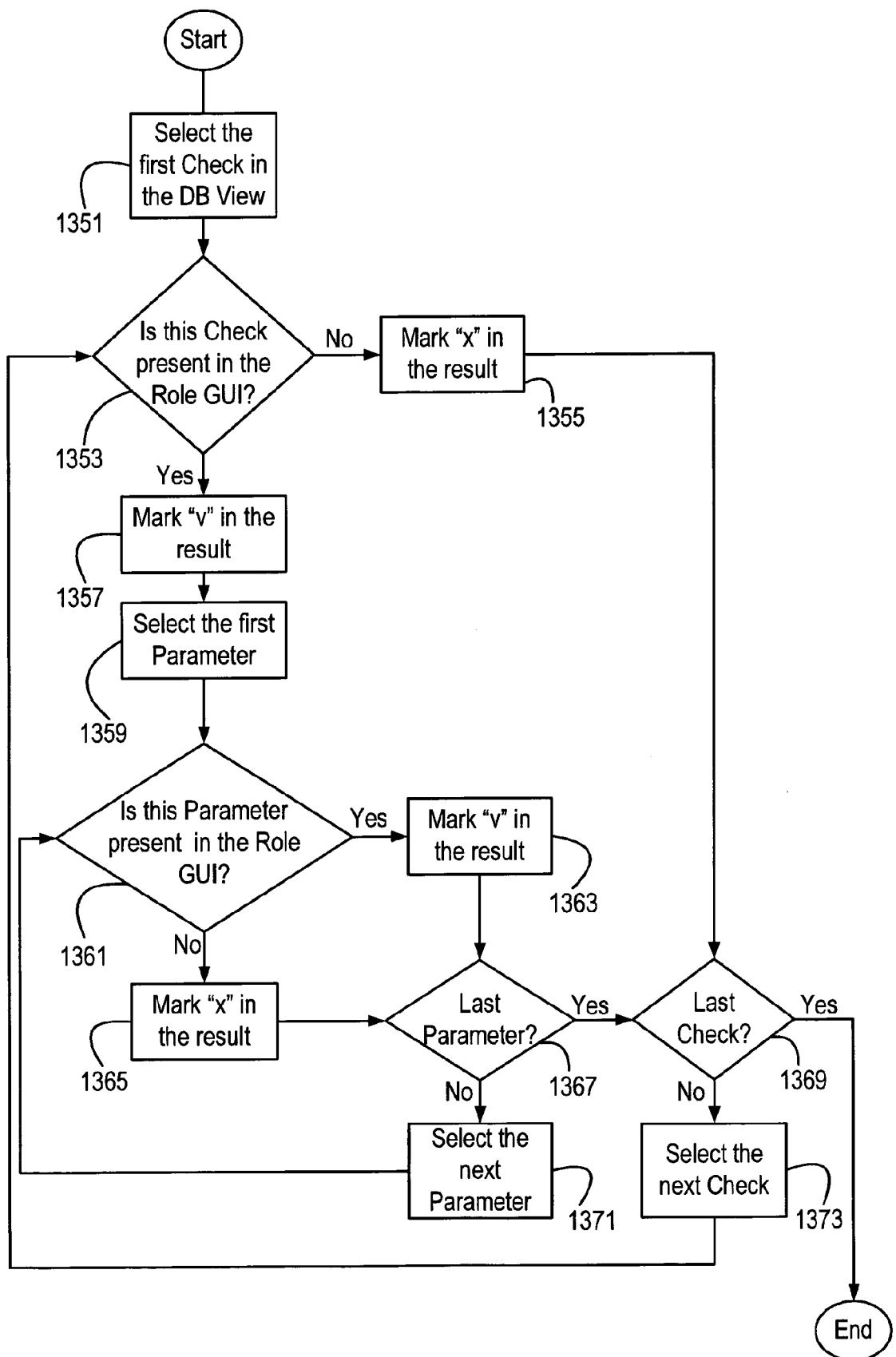
FIG. 13B is a flow chart describing a comparison algorithm for an e-business system by SAP AG which is executed on the Reference Data view and the verified Role table.
Figure 14A:
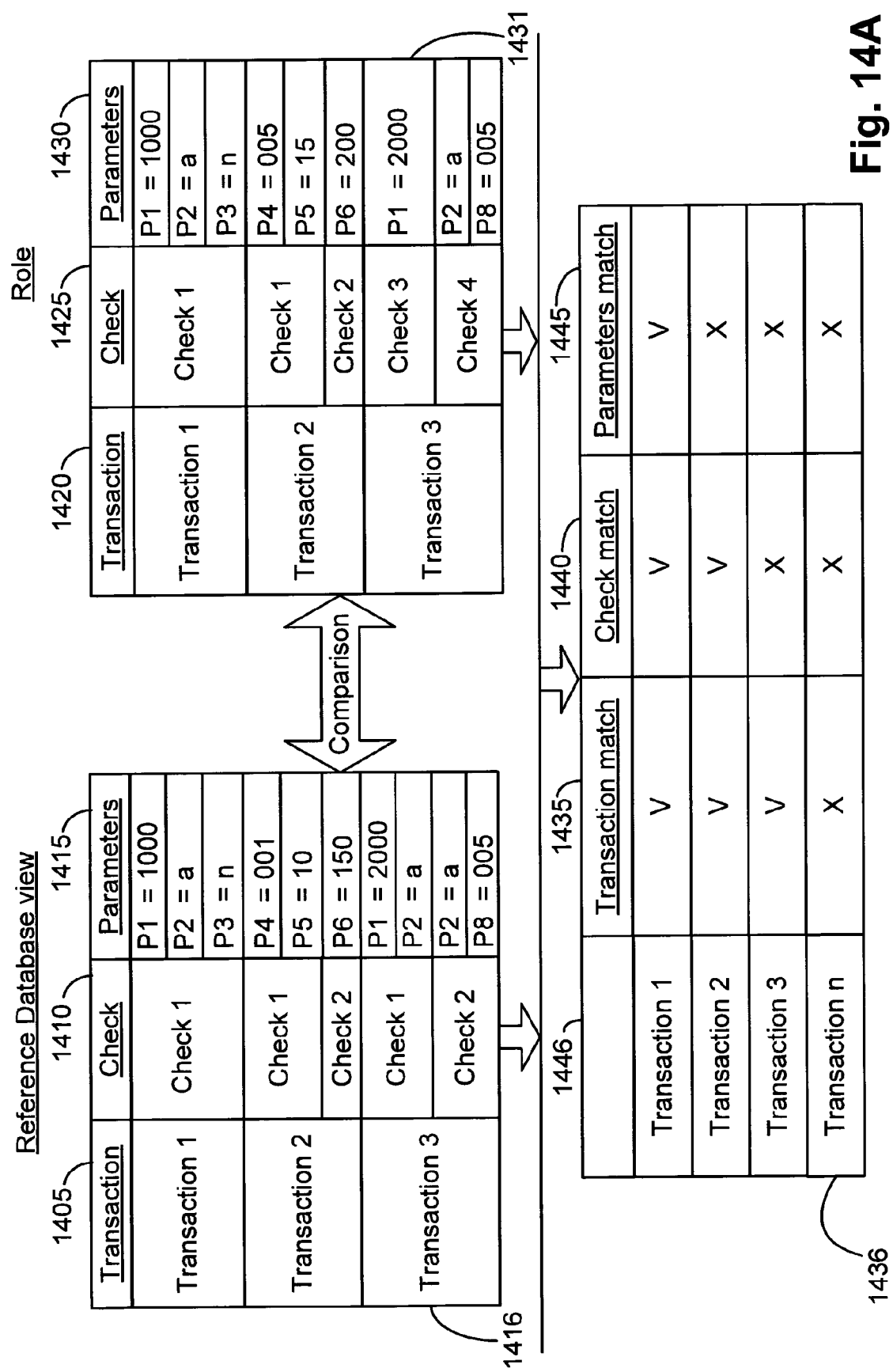
FIG. 14A shows the results of a comparison between the Reference Data view and the Role table in the verified generic e-business system.
Figure 14B:
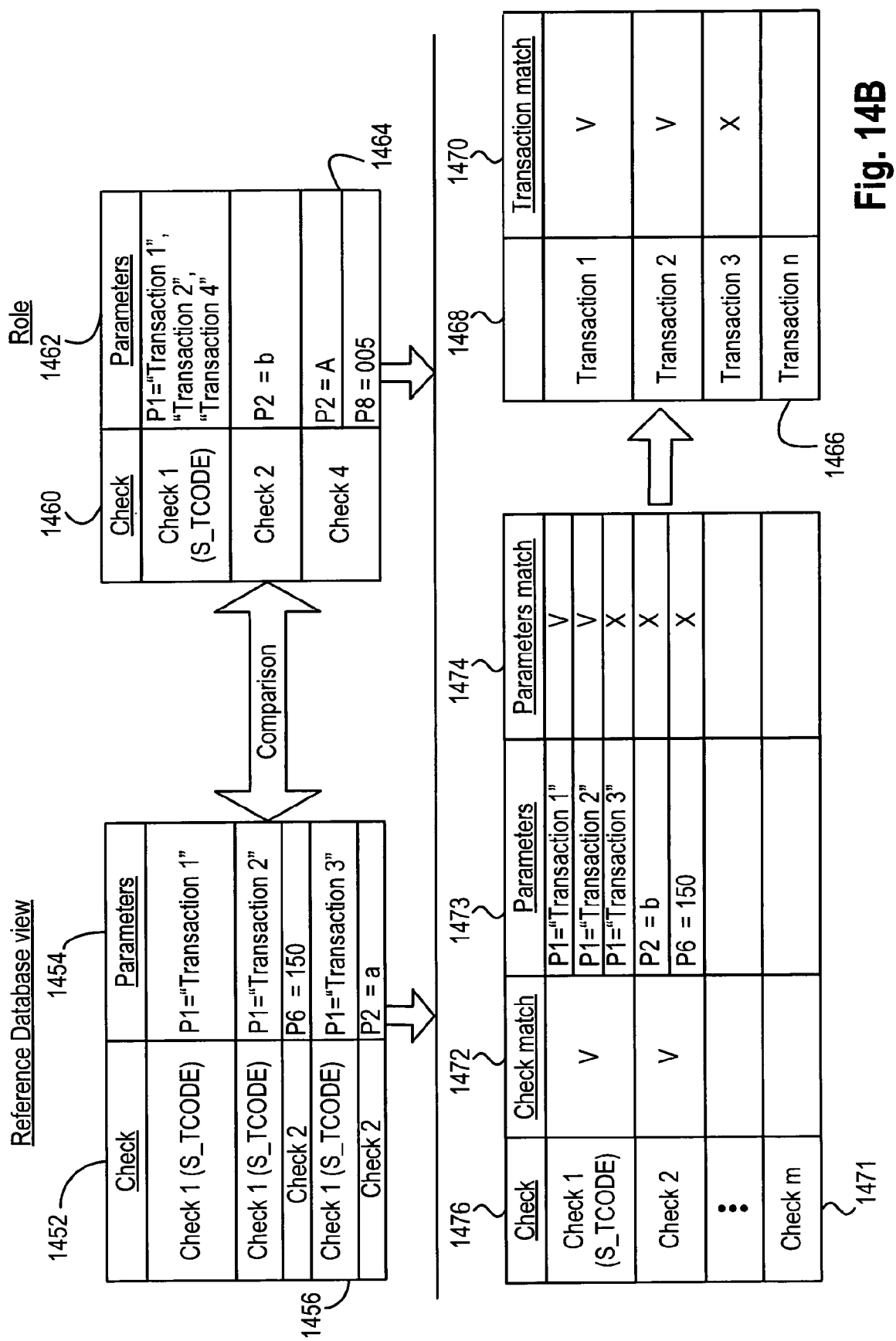
FIG. 14B shows the results of a comparison between the Reference Data view and the Role table in the verified e-business system by SAP AG.

FIG. 13A and FIG. 13B illustrate the comparison algorithm that is executed by the Verification Tool when a Role with its permissions in the target system is verified against the corresponding Reference Database view as described above with respect to FIG. 12. FIG. 13A shows the sequence of operations performed while comparing the Reference Data view as depicted in FIG. 14A. This is a generic model of the permissions data organization in an e-business system. An important application of the Verification Tool is in verifying permissions in SAP ERP and other e-business products by SAP AG. The permissions data structure of SAP AG products falls under the generic model, but its distinct features justify an explicit disclosure as shown in FIG. 13B and FIG. 14B. FIGS. 13A and 13B illustrate recursive procedures, which start from a top level in a permission data hierarchy and proceed thereafter downward through the levels.

Tables 1416 and 1431 in FIG. 14A show the hierarchical organization of permissions-related data under a Role. Effectively a Role has permissions for a number of Transactions. Each of these Transactions has one or more Permission Checks invoked when the Transaction is executed. Each of the Permission Checks has one or more Parameters attached to it. These Parameters need to have certain values so that the Transaction can be granted execution permission by the e-business system.

The Reference Database view 1416 in FIG. 14A illustrates the hierarchy of the Permission Checks and Parameters with their values corresponding to the Transactions in column 1405. The list of Transactions in column 1405 contains all the Transactions that the verified Role behind the table 1431 is entitled to execute. In the step 1301 of FIG. 13A, the comparison algorithm shown in FIG. 13A selects the first Transaction from the column 1405 of the Reference Data view 1416 in FIG. 14A. It verifies that this Transaction is present in the column 1420 of the Role table 1431. If the comparison in the step 1303 produces Boolean "false", the algorithm goes to the step 1307 in FIG. 13A which marks "x" in "Transactions match" column 1435 of the results table 1436 in FIG. 14A. Then the algorithm moves to the step 1329, where it checks if there is an additional Transaction in the column 1405 in FIG. 14A. If this Transaction was the last one in the column 1405 the algorithm ends.

If the comparison 1303 produces Boolean "true" the algorithm goes to the step 1305 in FIG. 13A and marks "v" in "Transactions match" column 1435 of the results table 1436 in FIG. 14A. Then the algorithm goes into the next level of comparison by checking in the step 1311 of FIG. 13A if the first Permission Check in the column 1410 corresponding to the first Transaction in the column 1405 in FIG. 14A is also present in the column 1425 under the corresponding Transaction in the column 1420 of the Role table 1431. If the comparison 1311 produces Boolean "false" the algorithm goes to the step 1313 in FIG. 13A which marks "x" in the "Check Match" column 1440 of the results table 1436 in FIG. 14A. Then the algorithm continues to the step 1327, where it checks if there is an additional Permission Check under the same Transaction in the column 1410 in FIG. 14A. If this was the last Permission Check for this Transaction the algorithm moves to the step 1329 and starts a new cycle for the next Transaction.

If the comparison in the step 1327 produces Boolean "false", the algorithm selects the next Permission Check in the step 1333 and repeats the loop for this Permission Check starting again from the step 1311 in FIG. 13A. If the comparison in the step 1311 produces Boolean "true" the algorithm goes to the step 1315 in FIG. 13A which marks "v" in "Check match" column 1440 of the results table 1436 shown in FIG. 14A. Then the algorithm goes into the third level of comparison by checking in the step 1319 in FIG. 13A if the first Parameter from the column 1415 corresponding to the above Permission Check from the column 1410 in FIG. 14A is present in the column 1430 under the same Check in the Role table 1431. If the comparison 1319 produces Boolean "false", the algorithm goes to the step 1323 in FIG. 13A which marks "x" in "Parameters Match" column 1445 of the results table 1436 in FIG. 14A.

Then the algorithm moves to the step 1325 where it checks if this is the last Parameter in the column 1415 in FIG. 14A. If the comparison 1325 produces Boolean "false", the algorithm selects the next Parameter from the list in the step 1331 and repeats the loop for this new Parameter starting again from the step 1319 in FIG. 13A. If the comparison 1325 produces Boolean "true" the algorithm progresses to the step 1327 and starts another cycle for the next Permission Check, selected in the step 1333. If the comparison in the step 1327 produces Boolean "false", the algorithm selects the next Parameter in the step 1331 and repeats the loop for this Parameter starting again from the step 1319 in FIG. 13A. If the comparison in the step 1319 produces Boolean "true", the algorithm moves to the step 1321 where it marks "v" in "Parameters Match" column 1445 of the results table 1436 in FIG. 14A. Then it continues to the comparison step 1325. If the comparison in the step 1327 produces Boolean "true", the algorithm progresses to the step 1329 and starts another cycle for the next transaction, selected in the step 1335. When the comparison in the step 1329 produced Boolean "false", the algorithm terminates.

FIG. 13B illustrates a private case of the algorithm disclosed in FIG. 13A for application to e-business systems by SAP AG. In these products the name of the Transaction appears as a value of a Parameter belonging to a Permission Check. This imposes a limitation regarding the possibility to identify the match between a Transaction and a Permission Check and the Parameters corresponding to it. Another limitation is that that the transaction field in SAP logs do not always contain the right values of the Transaction. Therefore the names of the Transactions need to be extracted from the Parameters' values. Other Transaction can be logged depending on various additional conditions. These operations are described below with reference to FIG. 14B.

FIG. 14B illustrates a comparison of a Role table 1464 with the Reference Data view 1456 which generates the results table 1471. The comparison does not involve Transactions in the way it was done in the generic algorithm shown in FIG. 13A and FIG. 14A because the log contains limited explicit information about the Transactions involved in a Business Process. In the e-business systems by SAP AG the values of the Transactions appear as Parameters of a Permission Check 1, which has a name 'S_TCODE'. When 'Transaction 1' appears as one of the Parameters under the PermissionCheck named 'Check 1', the Verification Tool (or the operator) understands that the Role has some permissions to execute the Transaction named 'Transaction 1'. The Reference Data view 1456 contains checks and parameters corresponding to the Role table fields with reference data. The field 1452 'Check' contains the values of the Permission Checks and the field 1454 'Parameters' contains the values of the corresponding Parameters.

The resulting table 1471 contains the column 1476 'Check' which is copied from the column 1452 'Check' of the Reference Database view 1456. The column 1472 'Check match' contains the result of the verification if the Permission Checks listed in the column 1452 'Check' of the Reference Database view 1456 are present in the column 1460 'Check' of the Role Table 1464. The resulting value is 'True' if the value of the Permission Check from the column 1452 is present in the column 1460. Following the comparison of the Permission Checks, the algorithm checks the match between the values of the Parameters pertaining to the Permission Checks in the Reference Data view 1456 and the Role Table 1464. This comparison is done only for those values of the Permission Checks from the column 1452 that yielded 'True' in the column 1472 of the Results table 1471. For the purposes of user-friendly data presentation, the content of the column 1454 'Parameters' in the Reference Database view 1456 is copied into the column 1473 of the results table 1471. The results of the Parameters comparison are stored in the column 1474 of the results table 1471. The comparison will yield Boolean 'True' if the Parameter from the column 1454 of the Reference Database view 1456 is present and has the same value in the field of the column 1462 of the Role table 1464 under the value of the corresponding Permission Check in the column 1460 of the Role table 1464. The comparison algorithm is disclosed in more detail in FIG. 13B.

The table 1466 contains the list of all Transactions that appear as Parameters in the Column 1473 of the results table 1471. This is done by filtering the column 1476 'Checks' of the results table 1471 for the value Check1 (S_TCODE), which corresponds to the Parameter containing the name of the Transaction in SAP AG products. The column 1468 contains the Transactions that are identified in this way. The values in the column 1470 'Transaction match' in the table 1466 are copied from the corresponding values in the column 1474 'Parameters match' in the table 1471.

Returning to the description of FIG. 13B: In step 1351 of FIG. 13B the comparison algorithm running on the Verification Tool selects the first Permission Check in the column 1452 of Reference Data view table 1456 in FIG. 14B. It verifies that this Permission Check is present in the column 1460 of the Role table 1464. If the comparison in the step 1353 produces Boolean 'false', the algorithm goes to the step 1355 in FIG. 13B, which marks 'x' in 'Check Match' column 1472 of the results table 1471 in FIG. 14B. Then the algorithm moves to the step 1369 where it checks if there is an additional Permission Check in the column 1452 in FIG. 14B. If there are no additional Permission Checks, the algorithm ends.

If the comparison 1369 produces Boolean 'false', the algorithm goes to the step 1373 in FIG. 13B, where it selects the next Permission Check from the list in the column 1452 in FIG. 14B and repeats the loop for this new Permission Check starting again from the step 1353. If the comparison in the step 1353 in FIG. 13B produces Boolean 'true', the algorithm goes to the step 1357 in FIG. 13B which marks 'v' in 'Check match' column 1472 of the results table 1471 in FIG. 14B. Then the algorithm goes into the second level of comparison in the step 1359 by checking if the first Parameter from the column 1454 corresponding to the above Check in the column 1452 in FIG. 14B is present in the column 1462 under the same Check in the Role table 1464. This is done in the step 1361 in FIG. 13B. If this comparison produces Boolean 'false' the algorithm goes to the step 1365 in FIG. 13B which marks 'x' in 'Parameters Match' column 1474 of the results table 1471 in FIG. 14B.

Then the algorithm moves to the step 1367 where it checks if there is an additional Parameter under the same Permission Check in the column 1454 in FIG. 14B. If the comparison 1367 produces Boolean 'false', the algorithm selects the next Parameter from the list in the step 1371 and repeats the loop for this Parameter starting again from the step 1361 in FIG. 13B. If the comparison in the step 1367 produces Boolean 'true' the algorithm progresses to the step 1369 and starts another cycle for the next Permission Check. If the comparison in the step 1369 produces Boolean 'true', the algorithm ends. If the comparison in the step 1369 produces Boolean 'false', the algorithm selects the next Permission Check in the step 1373 and repeats the loop for this Permission Check starting again from the step 1353 in FIG. 13B.

An illustration of verification for a Role is illustrated in FIG. 14A. The table 1431 shows a view of the Role in the verified e-business system, including Transactions, Permission Checks and Parameters that have been set for the Role in question by a system manager. The table 1416 illustrates the GUI of the Verification Tool with Role selected and the corresponding Merged Snapshot displayed to the user. The first step in the verification algorithms is comparison between the ordered lists of Transactions in the column 1420 'Transaction' for the Role to be verified and the column 1405 'Transaction' in the Reference Database View 1416.

Table 1436 contains the output of the comparison process for a single Role. The column 1435 contains the results of the comparison for Transaction fields in tables 1416 and 1431. Transactions marked with "v" are present in both tables. Transactions present in the table 1416 (the Reference Database view) but missing in the table 1431 (the e-business system GUI) will be marked with "x". Transactions present in the table 1431 (the e-business system GUI), but missing in the table 1416 (the Reference Database view) will not appear in the comparison results table 1436.

After the comparison for the Transactions, the algorithm will continue and compare the Permission Checks between the column 1425 ("Check") in the table 1431 (the e-business system GUI) and the corresponding column 1410 ("Check") in the table 1416 (the Reference Database view). This comparison will be performed for each of the Transactions in the results column 1446 of the results table 1436. The Permission Checks comparison will be positive and will be marked as "v" in the column 1440 of the results table 1436 if the set of Permission Checks for a certain Transaction in the e-business system GUI 1431 contains all the Permission Checks pertaining to the same Transaction in the Reference Database view 1416. Otherwise the comparison of the Permission Checks for a certain transaction is considered as failed and will be marked by "x" in the column 1440 "Check Match" of the results table 1434.

For the Transactions with matching Permission Checks in the results table 1434, the Verification Tool compares the Parameters. The Parameters comparison will be positive and will be marked as "v" in the column 1445 of the results table 1434 if the set of Parameters for a certain Permission Check in the e-business system GUI 1431 contains all the Parameters pertaining to the same Permission Check in the Reference Database view 1416. Otherwise the comparison of the Parameters for a certain Permission Check is considered as failed and will be marked by "x" in the column 1445 "Parameters Match" of the results table 1436.

In the above manner, the system operator of the Verification Tool is able to see any discrepancies between the desired permissions of any and all Roles within the scope of the verification and the actual permissions that were logged in the reference run of the e-business system. Any such discrepancy can be considered a fault in the configuration of the permissions, which may either allow a user to carry out transactions that he or she was not intended to perform, or may prevent a user from carrying out transactions that he should have been authorized to conduct. The operator may then make the appropriate modifications in the permission configuration via the user interface of the e-business system. Additionally or alternatively, the Verification Tool may be configured to compute the required modifications automatically, and then implement them, either autonomously or under the control of the system operator. This method will thus have the technical effect of adjusting the range of transactions that particular users are able to carry out in the e-business system and the conditions (in terms of checks and parameters) that the e-business system applies in determine whether to allow such transactions.

System Architecture

Figure 16:
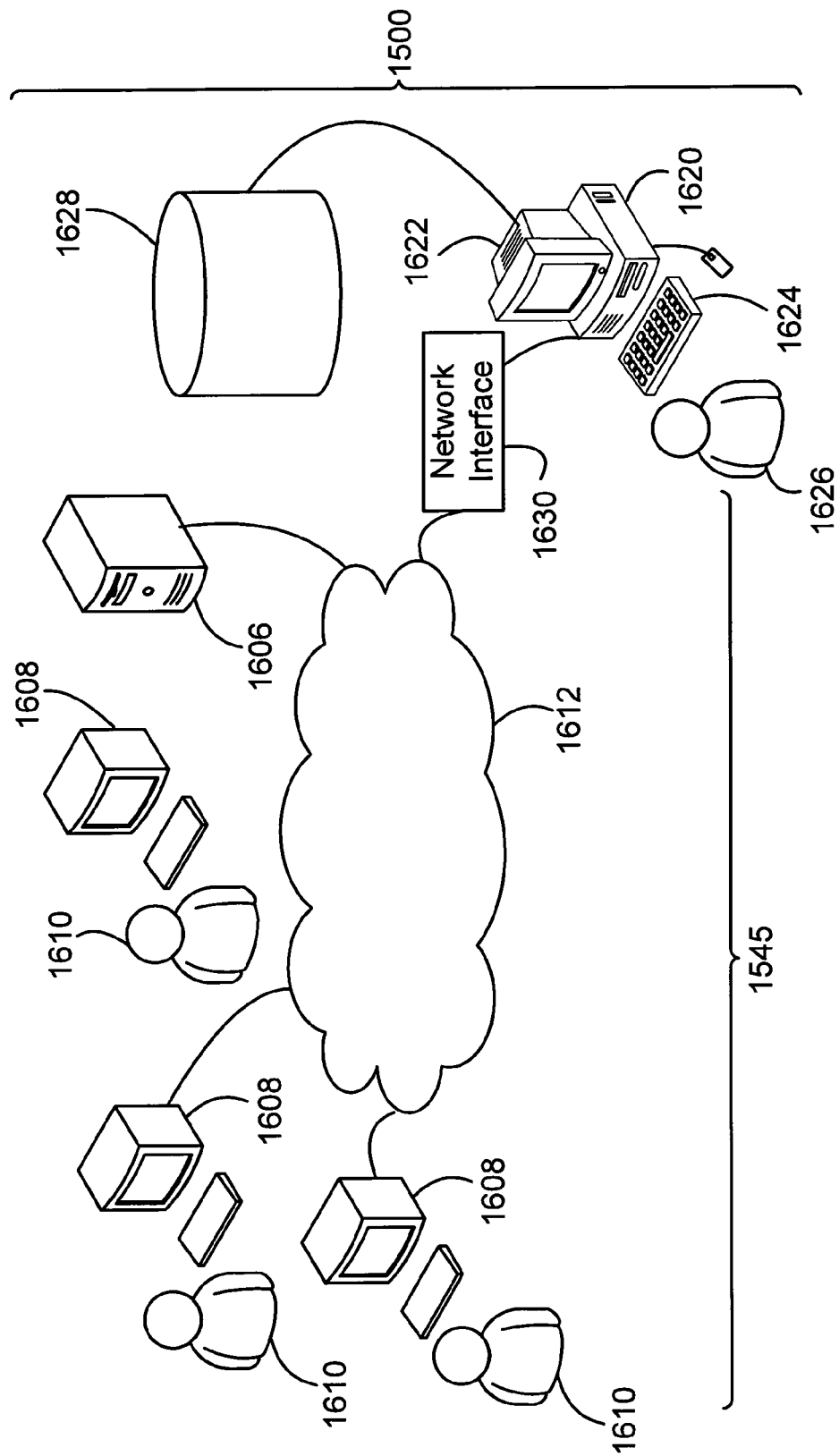
FIG. 16 is a block diagram showing the hardware configuration of an e-business system and a Verification Tool that is used in verifying permissions in the system.

FIG. 15 shows the functional architecture of the Verification Tool 1500 implementing the method disclosed above. The main functional components of the Verification Tool are: Business Editor, Snapshot Editor, Reference Database, Comparison Engine and its GUI, and interfaces to external systems. These functional components are implemented in computer hardware and software, as illustrated in FIG. 16.

Business Process Editor 1512 creates the list of business processes existing in the target system that are in the scope of the verification project. Subsequently, the Business Process Editor 1512 maps the Business Processes to the Roles. The list of the Roles is obtained from the target e-business system 1545 through the E-business System interface 1541. Alternatively, the list of Business Processes can be imported from the external systems 1501 such as SAP Solution Manager or ARIS through the Business Process Interface 1511 and edited using this editor. The operator's interaction with the editor is marked as User Input 1530. Once created, the list of Business Processes is stored into the Reference Database 1566 through the Database Interface 1516.

The Snapshot Editor 1526 is used to perform the following functions: editing the Raw Logs and saving them as Snapshots; Editing Snapshots and mapping Snapshots to Business Processes; Exceptions Table generation and updating; and merging Snapshots into Merged Snapshots. The Snapshot Editor 1526 acquires the file from the Raw Log 1506 using the Raw Log Interface 1521. The operator's interaction with the Snapshot Editor 1526 is marked as User Input 1536. Snapshots, Merged Snapshots and the mapping between the Snapshots and the Business Processes are saved and retrieved from the Reference Database 1566 through the Database Interface 1516.

The verification process is managed by the operator through the Comparison GUI 1538. The Comparison GUI 1538 serves as an interface to the Comparison Engine 1540. In order to execute the comparison, the Comparison Engine 1540 has an interface to the target e-business system 1545 through the E-system Interface 1541 and to the Reference Database 1566 through the Database Interface 1516.

The Reference Database 1566 supports the operations of the other key elements of the Verification Tool. Its operation involves execution of scripts implementing the logic of the reference data creation as described in FIGS. 8A, 8B and 8C. For the purpose of the implementation of the logic disclosed in FIGS. 8A, 8B and 8C, the Reference Database 1566 has in interface to the Target E-business System 1545 through the E-system Interface 1541.

FIG. 16 is a block diagram showing the hardware configuration of e-business system 1545 and of Verification Tool 1500 that is used in verifying permissions in the e-business system. The e-business system typically comprises one or more servers 1606, which communicate via a network 1612 with client terminals 1608. Users 1610 operate the client terminals in order to interact with the e-business system and carry out transactions that are part of a business process. The users' ability to carry out these transactions is determined, as noted above, by preconfigured permissions that are typically set on server 1606.

Verification Tool 1500 typically comprises a computer workstation, which has a suitable network interface 1630 for communicating with e-business system 1545 via network 1612. The workstation may be dedicated to the verification functions described above, or it may alternatively perform other functions, as well, including functions in the context of the e-business system. The verification tool comprises a processor 1620, which is typically a general-purpose computer processor, which is coupled to a user interface comprising a display 1622 and one or more input devices 1624, such as a keyboard and mouse, and to a memory 1628. The application and database software components in FIG. 15 typically run in software on processor 1620, while reference database 1566 is held in memory 1628. The software may be downloaded to the processor in electronic form, over a network, for example, or it may, additionally or alternatively, be held in tangible computer-readable storage media, such as optical, magnetic, or electronic memory media.

Creating and Changing Roles

As noted earlier, the system infrastructure and methods of information gathering that are described above may similarly be used in creating and changing roles to be used in the actual execution of an e-business process. In other words, instead of verifying the correctness of permissions that have already been assigned to roles, the information regarding transactions and the associated permission checks in the reference database can be used a priori in assigning the correct permissions to the roles that are to be involved in the e-business process. In this context, the Verification Tool described above is adapted to serve as a role setting tool. Equivalently, the methods described in this section may be used in defining profiles, which are closely related to roles, as defined above.

Figure 17:
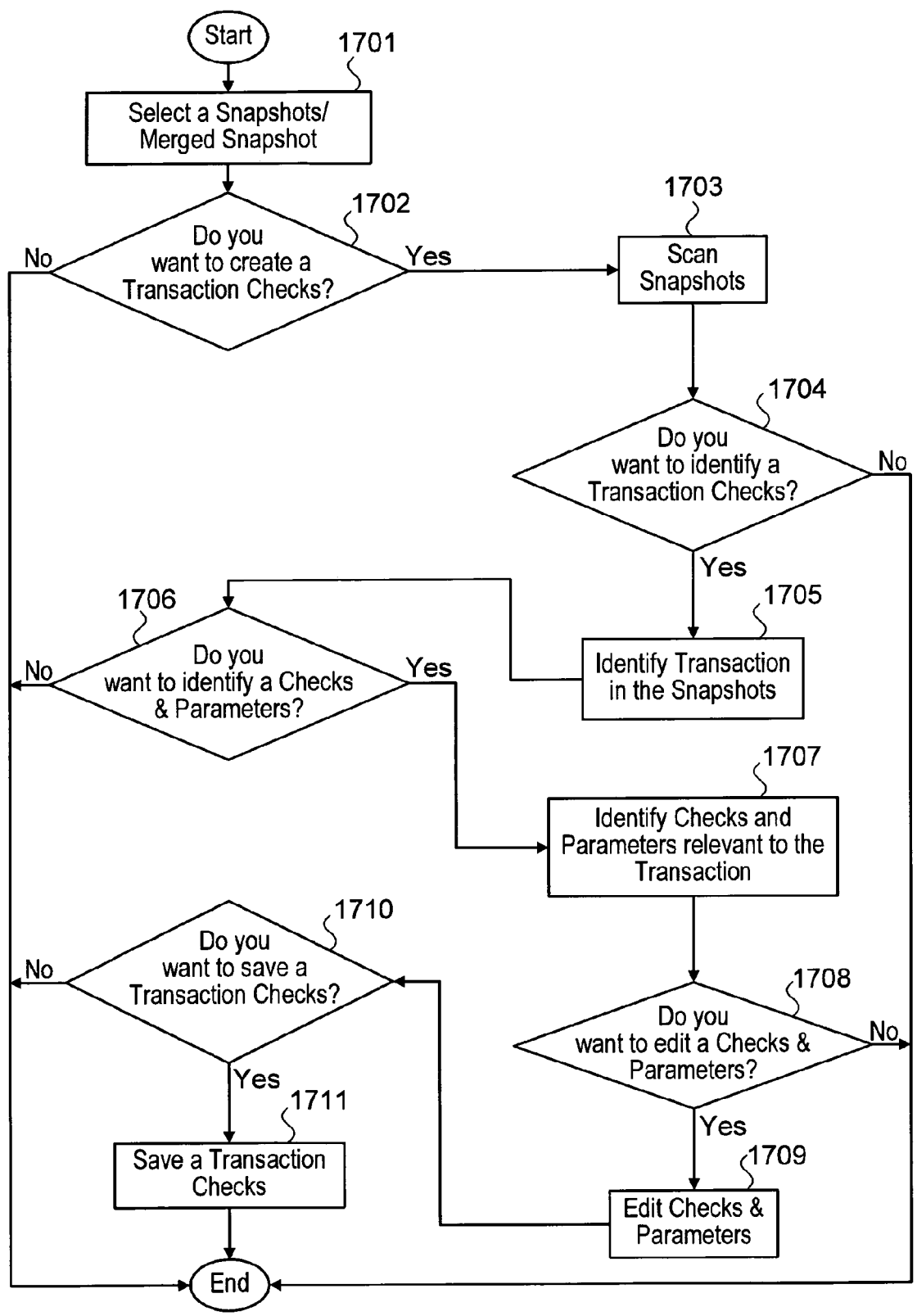
FIG. 17 is a flow chart showing a method for creating a record of transaction checks.

FIG. 17 is a flow chart showing a method for creating a record of transaction checks, which is to be used in role creation in an embodiment of the present invention. The starting point for this method is the reference database that was created by merging log records in the reference system, as described above. After merging and elimination of undesired information, the database contains snapshots of permission information with respect to one or more transactions that are to be executed in the e-business process of interest.

As a precursor to creating a role, the user (typically the e-business system operator) selects one or more snapshots (typically merged snapshots) from the reference database, at step 1701. The user instructs the role setting tool to create one or more transaction checks, at step 1702. (If the user chooses not to perform this step or any of the other steps described below, the method terminates.) In response, the tool collects and scans the relevant snapshots in the reference database, at step 1703. The user then instructs the tool to identify transaction checks occurring in the snapshots, at step 1704, and the tool identifies a transaction in the reference database for which permission checks have been performed, at step 1705. Next the user instructs the tool to identify the specific permission checks that have been carried out with respect to this transaction at step 1706. In response, the tool identifies the permission checks that have been performed and the parameters that were evaluated by the reference system in the course of the permission checks, at step 1707. Each parameter typically has a permitted value or range of values.

When the transaction information has been assembled, the user is called upon to edit the checks and parameters assembled by the tool for the transaction in question, at step 1708. The user inspects the transaction information and makes changes to the checks, parameters, and parameter values as necessary, at step 1709. The user interface then asks the user whether to save the edited transaction check information, at step 1710. Upon user confirmation, the information is saved by the tool at step 1711.

FIG. 18 shows a record of transaction checks that are used in defining a role. This sort of record is created as the result of the method shown in FIG. 17. The record includes one or more transactions that are carried out in the e-business process for which a role is to be created or changed. Each transaction has a set of one or more permission checks that the role must pass in order to execute the transaction. For each permission check, there are typically one or more parameters associated with the role that the e-business system evaluates in deciding whether to grant the permission. Permission is granted if the parameter is found to have a certain value (possibly a Boolean value) or a value falling within a certain range. Although certain specific checks, parameters and values appear in the snapshots in the reference database, the user may modify these data in setting the permissions that will be assigned to a given role (as noted above at step 1709).

Figure 19:
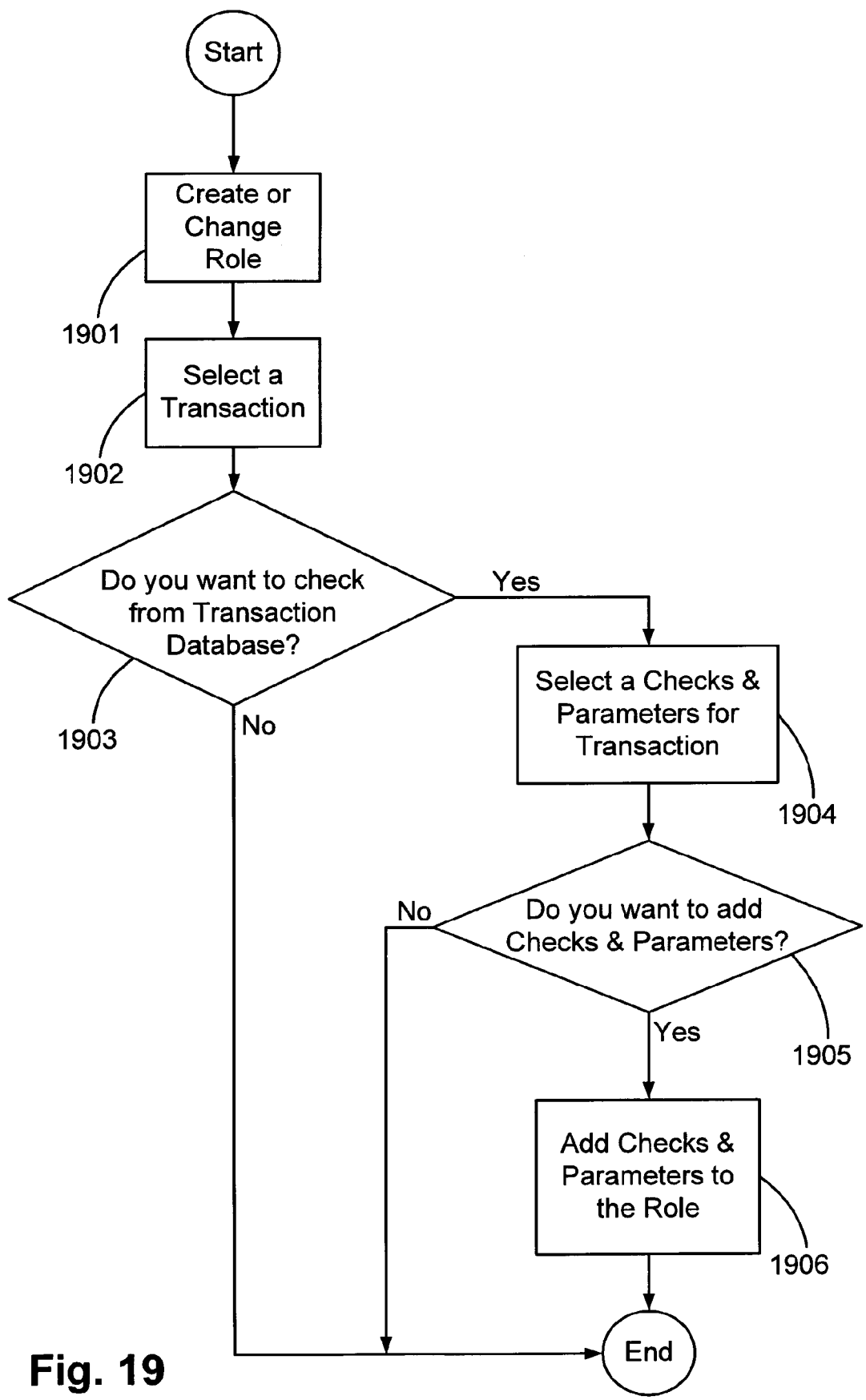
FIG. 19 is a flow chart showing a method for creating or changing a role.

FIG. 19 is a flow chart showing a method for creating or changing a role. A similar sort of method may also be used in creating a profile. The user (such as the system operator) identifies a new role that is to be created or selects an existing role to change, at step 1901. The user then identifies a transaction that is to be performed by the role, at step 1902. The role setting tool presents a list of the checks that are associated with the transaction in the reference database, at step 1903. The list may have the form shown in FIG. 18, for example.

The user selects the permission checks that the role will be required to pass in order to perform the transaction, at step 1904. The checks that are associated with a given transaction may all be assigned to the same role or, alternatively, the user may assign different checks to different roles, so that two or more roles must participate in order to complete the transaction. The role setting tool asks the user to confirm the checks and associated parameters that are to be added to the role definition, at step 1905. Upon user confirmation, the tool adds the selected checks to the role, at step 1906. At this point, the role definition may be considered complete, but the user may alternatively supplement the definition with additional permission checks by the same procedure as has just been described.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A verification method, comprising:
 configuring a reference system, running on a computer, to have a same set of executables and customizations as an e-business system to be verified;
 mapping one or more business processes that are implemented in the e-business system and are in the scope of the planned verification;
 executing the one or more business processes, using the reference system, and saving in a repository logs of permission checks conducted in executing the business processes;
 creating a merged permission log by merging records from the saved logs of the permission checks with respect to at least one role;
 comparing permission settings for the at least one role in the e-business system with corresponding permission values in the merged permission log for the at least one role; and
 based on the comparing of the permission settings, displaying to a user an indication of whether the permission settings in the e-business system match the corresponding permission values in the merged permission log,
 wherein comparing the permission settings comprises the steps of:
  (a) recursively executing, starting from a to level in a hierarchical structure of a reference view, a comparison between permission values at each level in the hierarchical structure, with corresponding values in a graphical user interface of the verified system;
  (b) marking Boolean "true" in a results table for each of the values in the hierarchical structure for which the compared values are equal; and
  (c) repeating step (a) for the next level of data under each of the values of the hierarchical structure for which Boolean "true" was produced in a previous iteration.

2. The verification method of claim 1, wherein the mapping of the business processes is accomplished by importing the business processes from an external software system.

3. The verification method of claim 1, wherein the merged permission log is generated in a dedicated e-business system environment not connected to the verified system.

4. The verification method of claim 1, wherein merging the records from the logs comprises processing the logs both manually and automatically.

5. The verification method of claim 4, wherein processing the logs comprises automatically deleting entries in a specified list from the logs.

6. The verification method of claim 1, wherein comparing the permission settings is done automatically using a comparison algorithm.

7. The verification method of claim 1, wherein merging the records comprises automatically eliminating information repeated in the merged logs.

8. The verification method of claim 1, wherein comparing the permission settings comprises automatically querying the verified system to obtain a list of the roles with the permissions settings.

9. The verification method of claim 1, comprising configuring the reference system to provide a maximal level of detail in the logs.

10. The verification method of claim 1, wherein creating the merged permission log comprises automatically deleting from the logs information that does not pertain to the permissions.

11. A verification apparatus, comprising:
 a memory;
 an interface; and
 a processor, which is coupled to communicate via the interface with a reference system configured to have a same set of executables and customizations as an e-business system to be verified and configured with one or more roles that have permissions to execute all transactions in a scope of a planned verification,
 wherein the processor is operative to map one or more business processes that are implemented in the e-business system and are in the scope of the planned verification, and upon executing the one or more business processes using the reference system, to save in the memory logs of permission checks conducted in executing the business processes, to create a merged permission log by merging records from the saved logs of the permission checks with respect to at least one role, to compare permission settings for the at least one role in the e-business system with corresponding permission values in the merged permission log for the at least one role, and based on the comparing of the permission settings, to display to a user an indication of whether the permission settings in the e-business system match the corresponding permission values in the merged permission log,
 wherein the processor is configured to compare the permission settings by carrying out the steps of:
  (a) recursively executing, starting from a to level in a hierarchical structure of a reference view, a comparison between permission values at each level in the hierarchical structure, with corresponding values in a graphical user interface of the verified system;

(b) marking Boolean "true" in a results table for each of the values in the hierarchical structure for which the compared values are equal; and (c) repeating step (a) for the next level of data under each of the values of the hierarchical structure for which Boolean "true" was produced in a previous iteration.

12. The verification apparatus of claim 11, wherein the processor is configured to import the business processes from an external software system.

13. The verification apparatus of claim 11, wherein the merged permission log is generated in a dedicated e-business system environment not connected to the verified system.

14. The verification apparatus of claim 11, wherein the processor is configured to enable processing of the logs both manually and automatically.

15. The verification apparatus of claim 14, wherein processing the logs comprises automatically deleting entries in a specified list from the logs.

16. The verification apparatus of claim 11, wherein the processor is configured to compare the permission settings automatically using a comparison algorithm.

17. The verification apparatus of claim 11, wherein the processor is configured to automatically eliminate information repeated in the merged logs.

18. The verification apparatus of claim 11, wherein the processor is configured to automatically query the verified system to obtain a list of the roles with the permissions settings.

19. The verification apparatus of claim 11, wherein the reference system is configured to provide a maximal level of detail in the logs.

20. The verification apparatus of claim 11, wherein the processor is configured to automatically delete from the logs information that does not pertain to the permissions.

21. A computer software product, comprising a non-transitory computer-readable medium in which program instructions are stored, which instructions, when read by a computer, cause the computer to communicate via an interface with a reference system configured to have the same set of executables and customizations as an e-business system to be verified and configured with one or more roles that have permissions to execute all transactions in a scope of a planned verification, and to map one or more business processes that are implemented in the e-business system and are in the scope of the planned verification, and upon executing the one or more business processes using the reference system, to save in a repository logs of permission checks conducted in executing the business processes, to create a merged permission log by merging records from the logs of the permission checks with respect to at least one role, to compare permission settings for the at least one role in the e-business system with corresponding permission values in the merged permission log for the at least one role, and based on the comparing of the permission settings, to display to a user an indication of whether the permission settings in the e-business system match the corresponding permission values in the merged permission log, wherein the instructions cause the computer to compare the permission settings by carrying out the steps of:

(a) recursively executing, starting from a to level in a hierarchical structure of a reference view, a comparison between permission values at each level in the hierarchical structure, with corresponding values in a graphical user interface of the verified system;

(b) marking Boolean "true" in a results table for each of the values in the hierarchical structure for which the compared values are equal; and (c) repeating step (a) for the next level of data under each of the values of the hierarchical structure for which Boolean "true" was produced in a previous iteration.

22. The product of claim 21, wherein the instructions cause the computer to import the business processes from an external software system.

23. The product of claim 21, wherein the merged permission log is generated in a dedicated e-business system environment not connected to the verified system.

24. The product of claim 21, wherein the instructions cause the computer to enable processing of the logs both manually and automatically.

25. The product of claim 24, wherein processing the logs comprises automatically deleting entries in a specified list from the logs.

26. The product of claim 21, wherein the instructions cause the computer to compare the permission settings automatically using a comparison algorithm.

27. The product of claim 21, wherein the instructions cause the computer to automatically eliminate information repeated in the merged logs.

28. The product of claim 21, wherein the instructions cause the computer to automatically query the verified system to obtain a list of the roles with the permissions settings.

29. The product of claim 21, wherein the reference system is configured to provide a maximal level of detail in the logs.

30. The product of claim 21, wherein the instructions cause the computer to automatically delete from the logs information that does not pertain to the permissions.

* * * * *